(12) United States Patent
Lim et al.

(10) Patent No.: US 10,645,613 B2
(45) Date of Patent: May 5, 2020

(54) METHOD AND APPARATUS FOR GENERATING PACKET IN MOBILE COMMUNICATION SYSTEM

(71) Applicants: Samsung Electronics Co., Ltd, Suwon-si (KR); University-Industry Cooperation Group of Kyung Hee University, Yongin-si (KR)

(72) Inventors: Han-Na Lim, Seongnam-si (KR); Sung-Won Lee, Seongnam-si (KR); Gi-Jeong Kim, Suwon-si (KR); Jung-Shin Park, Seoul (KR)

(73) Assignees: Samsung Electronics Co., Ltd., Suwon-si (KR); University-Industry Cooperation Group of Kyung Hee University, Youngin-si (KR)

( * ) Notice: Subject to any disclaimer, the term of this patent is extended or adjusted under 35 U.S.C. 154(b) by 0 days.

(21) Appl. No.: 15/558,989

(22) PCT Filed: Mar. 17, 2016

(86) PCT No.: PCT/KR2016/002714
§ 371 (c)(1),
(2) Date: Sep. 15, 2017

(87) PCT Pub. No.: WO2016/148527
PCT Pub. Date: Sep. 22, 2016

(65) Prior Publication Data
US 2018/0249371 A1    Aug. 30, 2018

(30) Foreign Application Priority Data
Mar. 17, 2015 (KR) .......... 10-2015-0036581

(51) Int. Cl.
*H04W 28/06* (2009.01)
*H04L 29/08* (2006.01)
(Continued)

(52) U.S. Cl.
CPC ......... *H04W 28/065* (2013.01); *H04L 45/566* (2013.01); *H04L 49/35* (2013.01);
(Continued)

(58) Field of Classification Search
CPC ..... H04L 67/327; H04L 45/306; H04L 41/12; H04L 45/02; H04L 45/54; H04L 45/64;
(Continued)

(56) References Cited

U.S. PATENT DOCUMENTS 8,832,820 B2   9/2014 Barjatiya et al.
2003/0152065 A1*  8/2003 Chang ................ H04M 1/2535
370/352
(Continued)

FOREIGN PATENT DOCUMENTS

EP         2725763 A1    4/2014
KR   20080076464 A    8/2008
(Continued)

OTHER PUBLICATIONS

Author Unknown, Fiber Channel Physical and Signaling Interface, pp. 1-82, Jun. 1, 1994 (Year: 1994).*
(Continued)

*Primary Examiner* — Christopher M Crutchfield

(57) ABSTRACT

The present invention relates to a 5G or pre-5G communications system for supporting a higher data transmission rate beyond a 4G communication system such as LTE. The present invention relates to a method and an apparatus for generating a packet in a mobile communication system. A method according to an embodiment of the present invention, which is a method for generating a packet from a device in a mobile communication system, comprises the steps of: generating a function-based packet and transmitting the packet to a target node, wherein the packet is characterized in that an internet protocol (IP) address is not included therein.

20 Claims, 28 Drawing Sheets

(51) Int. Cl.
*H04L 12/931* (2013.01)
*H04L 12/721* (2013.01)
*H04L 12/715* (2013.01)
*H04L 29/06* (2006.01)
*H04L 29/12* (2006.01)
*H04W 84/04* (2009.01)

(52) U.S. Cl.
CPC ............ *H04L 67/327* (2013.01); *H04L 67/34* (2013.01); *H04L 45/64* (2013.01); *H04L 61/1511* (2013.01); *H04L 67/02* (2013.01); *H04L 67/12* (2013.01); *H04L 69/168* (2013.01); *H04W 84/042* (2013.01)

(58) Field of Classification Search
CPC ......... H04L 45/12; H04L 45/38; H04L 40/70; H04L 41/806
See application file for complete search history.

(56) References Cited

U.S. PATENT DOCUMENTS

| 2007/0286151 | A1 | 12/2007 | Prakash et al. | |
| 2013/0197908 | A1* | 8/2013 | Zhong | G10L 25/60 704/235 |
| 2019/0294449 | A1* | 9/2019 | Leon | H04L 67/12 |

FOREIGN PATENT DOCUMENTS

| KR | 20080095668 A | 10/2008 |
| KR | 1020090028613 A | 3/2009 |

OTHER PUBLICATIONS

Antonio Carzaniga, Matthew J. Rutherford, and Alexander L. Wolf, A Routing Scheme for Content-Based Networking, pp. 1-11, 2004 (Year: 2004).*

K.L. Eddie Law, Roy Leung, A Design and Implementation of Active Network Socket Programming, pp. 78-83, 2002 (Year: 2002).*

Young-Bo Sim, Sungwon Lee, An implementation of active network for multi radio access technology: Function Oriented-Networking, Oct. 30, 2015, pp. 1-3 (Year: 2015).*

D. Wetherall, Service Introduction in an Active Network, Mar. 5, 1999, pp. 1-157 (Year: 1999).*

Author Unknown, Definition of Active Network, pp. 1-6, as retrieved from the internet archive, www.archive.org, on Nov. 20, 2010 (Year: 2010).*

X. Fan, Real-Time Services in Packet-Switched Networks for Embedded Applications, pp. 1-135, 2007 (Year: 2007).*

International Search Report dated Jul. 18, 2016 in connection with International Patent Application No. PCT/KR2016/002714.

Written Opinion of the International Searching Authority dated Jul. 18, 2016 in connection with International Patent Application No. PCT/KR2016/002714.

* cited by examiner

610 socket()

socket = socket(PF_INET, SOCK_STREAM, 0);

620 connect()

struct sockaddr_in server_addr;
memset(&server_addr, 0, sizeof(server_addr));
server_add.sin_family = AF_INET;
srrver_add.sin_port = htons(4000);
server_addr.sin_addr.s_addr = inet_addr("127.0.0.1");
connect(socket, (struct sockaddr*)&server_addr,
sizeof(server_addr));

1800 socket()

socket = socket(PF_FON, SOCK_FUNCTION, 0);

1810 connect()

struct sockaddr_in server_addr;
memset(&server_addr, 0, sizeof(server_addr));
server_add.sin_family = AF_FON;
srrver_add.sin_port = htons(0000);
server_addr.sin_addr.s_addr = inet_addr("0.102.111.110"); /* "fon" */
connect(socket, (struct sockaddr*)&server_addr, sizeof(server_addr));

| Function Table | | |
|---|---|---|
| Function Name | Function Code | Statistics |
| PacketSend () | { ... } | 100 |
| SystemRead () | { ... } | 200 |

```
<FON Device Info>
       <Wi-Fi MAC Address>
              11:22:33:44:55:66
       </Wi-Fi MAC Address>
       <IMSI>
              450051012341234
       </IMSI>
</FON Device Info>

<Function Invocation Info>
       <Function 1>
              <Invocating Number> 2 </Invocating Number>
       </Function 1>
       <Function 2>
              <Invocating Number> 3 </Invocating Number>
       </Function 2>
</ Function Invocation Info>
```

FIG.24

| | FUNCTION NAME | FUNCTION FUNCTIONALITY |
|---|---|---|
| PACKET TRANSPORTATION | PacketSend() | TRANSFER PACKET TO PLACE THAT REQUESTED PACKET |
| | PacketInsertField() | INSERT REQUESTED VALUE INTO PREDETERMINED LOCATION (FIELD) OF PACKET |
| | PacketRemoveField() | REMOVE VALUE FROM PREDETERMINED LOCATION (FIELD) OF PACKET |
| | PacketAddField() | INSERT REQUESTED VALUE AT END OF PACKET |
| | PacketPorts() | READ PORT NUMBER(S) TO WHICH PACKET IS TO BE TRANSMITTED |
| SYSTEM INFORMATION RETRIEVAL | SystemRead() | READ SYSTEM INFORMATION OF FON NODE |
| USER INFORMATION RETRIEVAL | SubscriberRead() | READ USER/TERMINAL INFORMATION ACCESSING FON NODE |
| USER STORAGE USAGE | StorageAvailability() | DETERMINE WHETHER VARIABLE REQUESTED BY USER EXISTS IN FON NODE |
| | StorageCreate() | GENERATE VARIABLE REQUESTED BY USER IN FON NODE |
| | StorageRead() | READ VARIABLE VALUE GENERATED BY USER IN FON NODE |
| | StorageWrite() | STORE VARIABLE VALUE GENERATED BY USER IN FON NODE |
| | StorageRemove() | REMOVE VARIABLE REQUESTED BY USER FROM FON NODE |
| OPERATOR FUNCTIONALITY EXECUTION | MathRandom() | CALCULATE RESULT VALUE BY USING RANDOM FUNCTION WITHIN INPUT RANGE |
| | MathGetMax() | COMPARE INPUT VALUES AND RETURN MAXIMUM VALUE |

FIG.25

```
<Command>
        Publication
</Command>

<Target>
        FON Device, FON Node
</Target>

<Function Table>
        <Function 1>
                <name> A </name>
                <input parameter> int </input parameter>
                <output parameter> void </output parameter>
                <Function Code>
                        A(int a1)
                        {
                                Print(a1);
                        }
                </Function Code>
        </Function 1>
        <Function 2>
                <name> B </name>
                <input parameter> char </input parameter>
                <output parameter> void </output parameter>
                <Function Code>
                        B(char b1)
                        {
                                Print(b1);
                        }
                </Function Code>
        </Function 2>
</Function Table>
```

```
<Command>
        Delete
</Command>

<Target>
        FON Node  FON Device, FON Node
</Target>

<Function Table>
        <Function 1>
                <name> A </name>
                <input parameter> int </input parameter>
                <output parameter> void </output parameter>
                <Function Code>
                        A(int a1)
                        {
                                Print(a1);
                        }
                </Function Code>
        </Function 1>
</Function Table>
```

```
<Command>
        Add
</Command>

<Target>
        FON Node  FON Device, FON Node
</Target>

<Function Table>
        <Function 1>
                <name> C </name>
                <input parameter> Boolean </input parameter>
                <output parameter> void </output parameter>
                <Function Code>
                        C(bool c1)
                        {
                                Print(c1);
                        }
                </Function Code>
        </Function 1>
</Function Table>
```

FIG.28

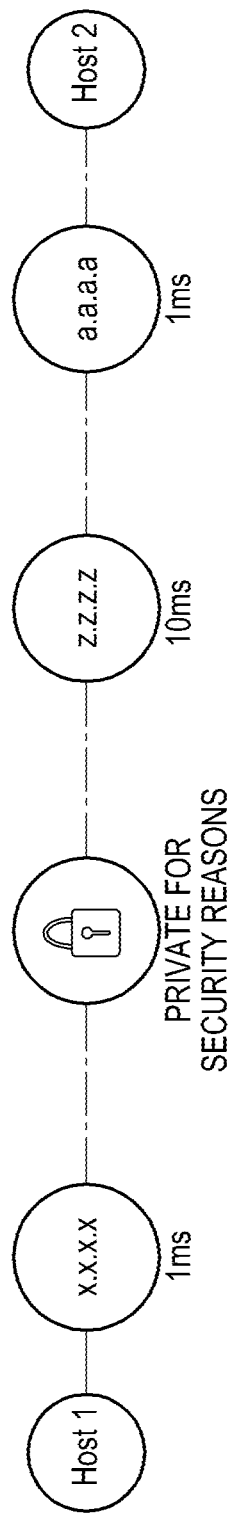
FIG.32
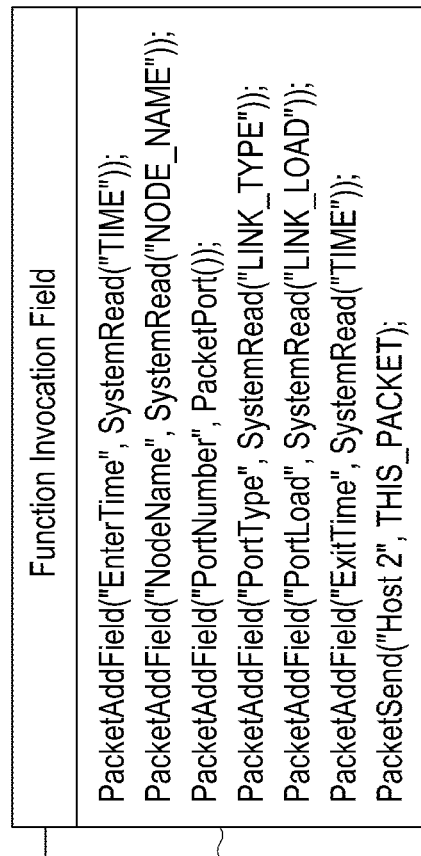
FIG.33
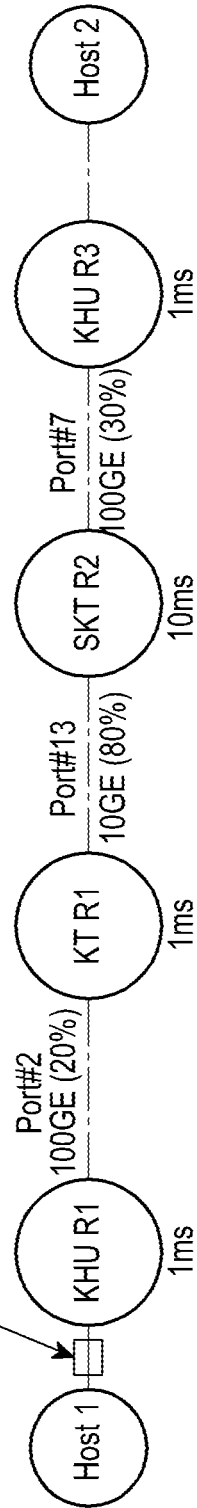

METHOD AND APPARATUS FOR GENERATING PACKET IN MOBILE COMMUNICATION SYSTEM

This application is a National Phase Entry of PCT International Application No. PCT/KR2016/002714, filed on Mar. 17, 2016, which claims priority to Korean Patent Application No. 10-2015-0036581, filed Mar. 17, 2015, the contents of which are incorporated herein by reference.

TECHNICAL FIELD

The present invention relates to a method and apparatus for generating a packet in a mobile communication system.

BACKGROUND

In order to meet wireless data traffic demands, which have increased since 4th Generation (4G) communication system commercialization, efforts to develop an improved $5^{th}$ Generation (5G) communication system or a pre-5G communication system have been made. For this reason, the 5G communication system or the pre-5G communication system is called a beyond 4G network communication system or a post-LTE system.

In order to achieve a high data transmission rate, an implementation of the 5G communication system in a super-high frequency (mmWave) band (e.g., 60 GHz band) is being considered. In the 5G communication system, technologies such as beamforming, massive MIMO, Full Dimensional MIMO (FD-MIMO), an array antenna, analog beam-forming, and a large scale antenna are being discussed to mitigate a propagation path loss in the super-high frequency band and to increase a propagation transmission distance.

Further, technologies such as an evolved small cell, an advanced small cell, a cloud Radio Access Network (cloud RAN), an ultra-dense network, Device-to-Device communication (D2D), a wireless backhaul, a moving network, cooperative communication, Coordinated Multi-Points (CoMP), and reception interference cancellation have been developed to improve the system network in the 5G communication system.

In addition, the 5G system has developed Advanced Coding Modulation (ACM) schemes such as Hybrid FSK and QAM Modulation (FOAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Internet Protocol (IP) networking has rapidly developed on the strength of the dramatic development of Internet technology. In IP networking, each user and a predetermined server have their fixed addresses, that is, IP addresses, and operate, and routing is performed based on an address.

Various schemes have been proposed to provide a large amount of data to a terminal in a mobile communication system. One of the schemes is allocating an IP address to a mobile terminal. In other words, the concept of a mobile IP has been introduced.

A router supports IP networking, whereby end terminals can communicate in a global network. However, an IP address in the IP networking is only used as unique identification of a terminal in the global network. Therefore, the IP address merely supports packet transmission, but has difficulty in supporting a multimedia and interactive communication service. Furthermore, service is not recognized using only an IP address in an environment where various application services are made, and thus it is not allowed to provide a supplementary service in the network. Also, a router integrates a control plane and a data plane into a single device and each router has different control plane information from the others and operates independently. Therefore, the structure of a router makes it difficult to introduce a new networking protocol. Also, the router uses a full distribution-based routing algorithm and protocol, and thus a network operator cannot directly define a routing policy, which is a drawback. Moreover, a user and an Internet service provider cannot manage the routing policy, and cannot determine static/dynamic information of a network.

SUMMARY

The present invention provides a method and apparatus for generating a packet in a mobile communication system.

The present invention provides a method and apparatus for allowing a user/Internet service provider to directly apply a desired functionality to a network.

According to embodiments of the present invention, there is provided a packet-generating method in a device in a mobile communication system, the method including: generating a function-based packet and transmitting the packet to a target node, wherein the packet excludes an Internet Protocol (IP) address.

According to the present invention, a user/Internet service provider can directly apply a desired functionality to a network.

BRIEF DESCRIPTION OF THE DRAWINGS

FIG. 18 is a diagram illustrating an example of a socket-control-related program code of a FON-based application in a FON device;

FIG. 23 is a diagram illustrating an example and a structure of a function table stored in a DB of a FON node;

FIG. 24 is a format illustrating an example of a function usage information report message;

FIG. 25 is a diagram illustrating an example of a list of basic functions supported by a FON node;

FIG. 26 is a diagram illustrating an example and a structure of a function distribution message according to an embodiment of the present invention;

FIG. 27 is a diagram illustrating an example and a structure of a function deletion message according to an embodiment of the present invention;

FIG. 28 is a diagram illustrating an example and a structure of a function addition message according to an embodiment of the present invention;

FIG. 32 is a diagram illustrating a normal example of collecting information about a packet transmission path between terminals;

FIG. 33 is a scenario of collecting information about a packet transmission path between terminals according to an embodiment of the present invention;

DETAILED DESCRIPTION

Figure 1:
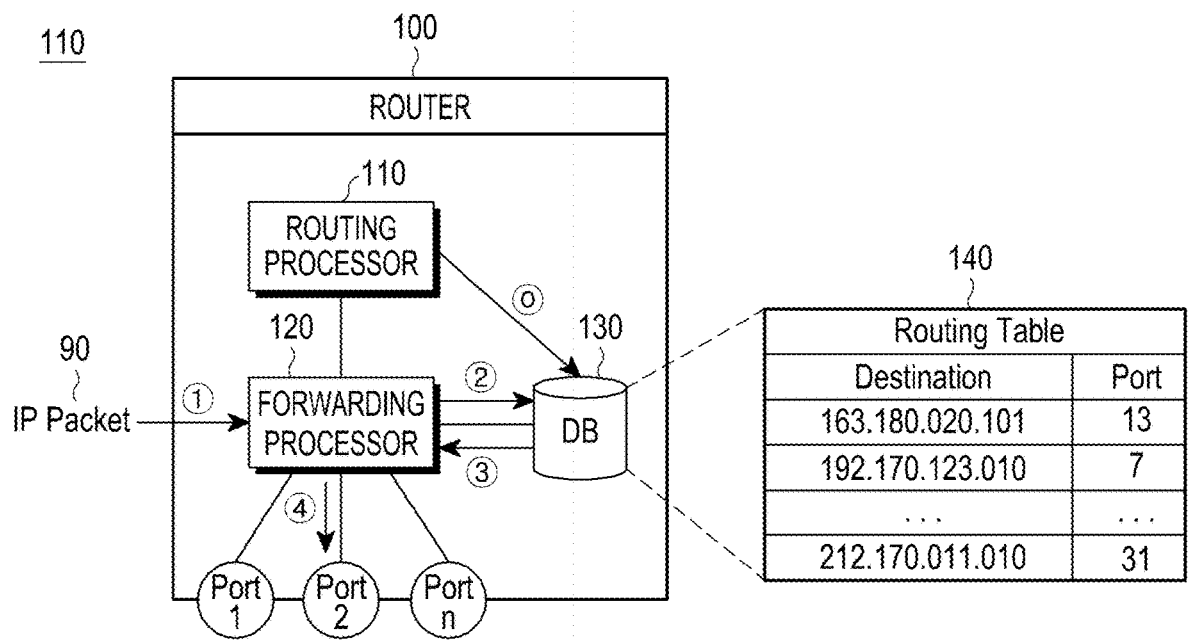
FIG. 1 is a diagram illustrating the structure of a router that supports a router packet transmission scheme.

Hereinafter, exemplary embodiments of the present invention will be described in detail with reference to the accompanying drawings. The same elements will be designated by the same reference numerals although they are shown in different drawings. Further, a detailed description of a known function and configuration which may make the subject matter of the present invention unclear will be omitted.

Further, terms or words used in the description and claims below should not be interpreted as only general or dictionary meanings, but interpreted as meanings and concepts satisfying the technical spirit of the present invention based on a principle in that the inventor can appropriately define his/her invention with a concept of the terms in order to describe the invention in the best method.

The terms used in this application is for the purpose of describing particular embodiments only and is not intended to limit the invention. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

Embodiments of the present invention may be applied to various communication systems, such as a Long-Term Evolution (LTE) mobile communication system, a Long-Term Evolution-Advanced (LTE-A) mobile communication system, a High-Speed Downlink Packet Access (HSDPA) mobile communication system, a High-Speed Uplink Packet Access (HSUPA) mobile communication system, a High-Rate Packet Data (HRPD) mobile communication system of $3^{rd}$ Generation Project Partnership 2 (3GPP2), a Wideband Code Division Multiple Access (WCDMA) mobile communication system of 3GPP, a Code Division Multiple Access (CDMA) mobile communication system of 3GPP2, an 802.16m communication system of Institute of Electrical and Electronics Engineers (IEEE), an Evolved Packet System (EPS), and a mobile Internet Protocol (mobile IP) system.

A packet routing and forwarding technology includes a router packet transmission scheme in which a control plane and a data plane are integrated and an OpenFlow packet transmission scheme in which a control plane and a data plane are separated.

FIG. 1 is a diagram illustrating the structure of a router that supports a router packet transmission scheme.

A router 100 includes a routing processor 110, a forwarding processor 120, and a database (DB) 130 to route and forward an IP packet.

The routing processor 110 generates a routing table 140 including physical port information (hereinafter referred to as "port information") associated with a destination IP address.

The DB 130 stores a generated routing table.

When an IP packet is received, the forwarding processor 120 refers to the routing table 140 stored in the DB 130 to identify a physical port corresponding to a destination IP address of the corresponding IP packet. When the destination IP address of the received packet exists in the routing table, the forwarding processor 120 forwards the IP packet to a physical port corresponding to the destination IP address. However, when information associated with the destination IP address of the received packet does not exist in the routing table, the forwarding processor 120 forwards the IP packet to a default physical port.

Figure 2:
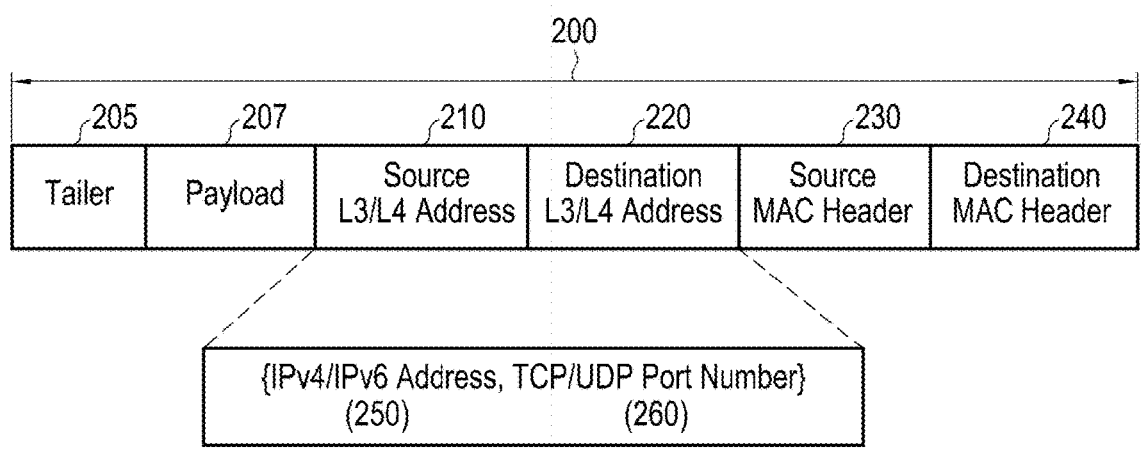
FIG. 2 is a diagram illustrating the structure of an IP packet that supports a router packet transmission scheme.

FIG. 2 is a diagram illustrating the structure of an IP packet that supports a router packet transmission scheme.

An IP packet 200 of FIG. 2 includes a trailer 205, a payload 207, a source L3/L4 address field 210, a destination L3/L4 address field 220, a source MAC header 230, and a destination MAC header 240. The source L3/L4 address field 210 and the destination L3/L4 address field 220 each include an IPv4/IPv6 address (hereinafter referred to as an "IP address") 250, a TCP/UDP port number 260, and the like.

Figure 3:
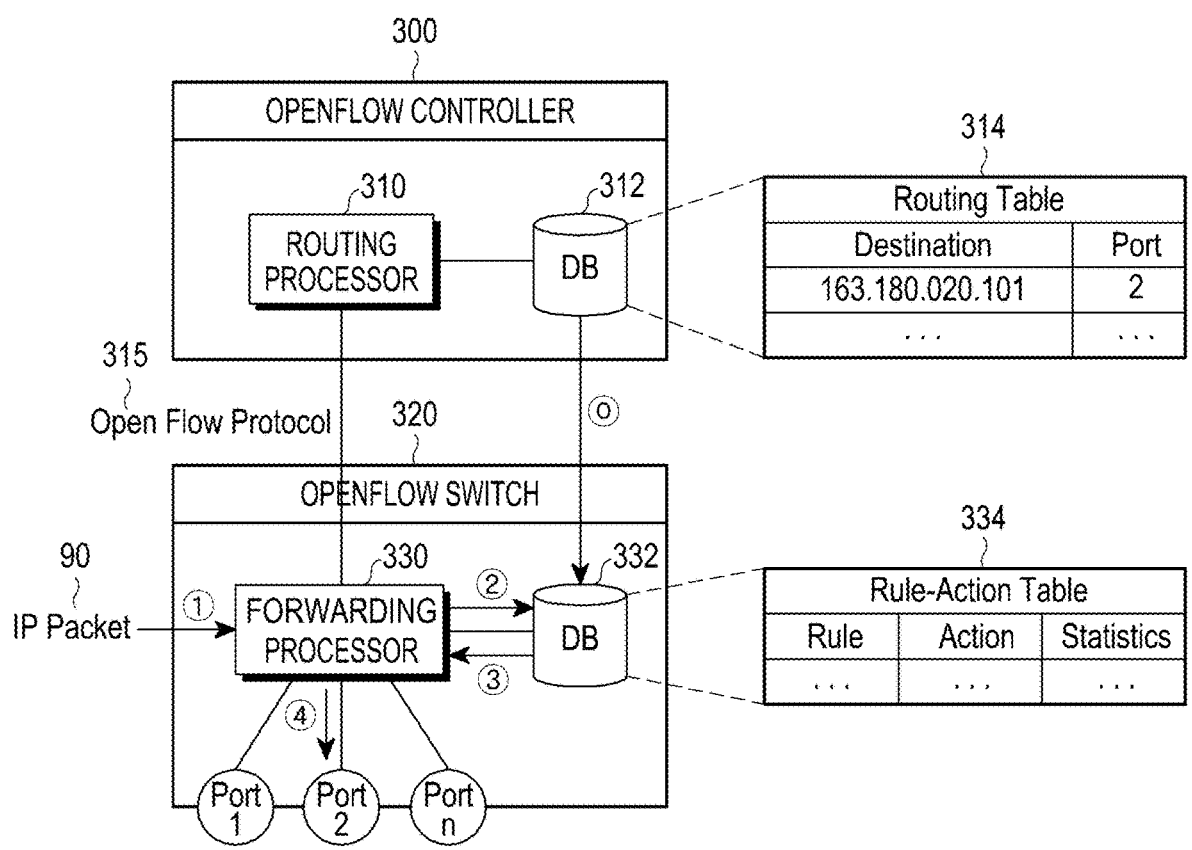
FIG. 3 is a diagram illustrating the structure of a router that supports an OpenFlow packet transmission scheme.

FIG. 3 is a diagram illustrating the structure of a router that supports an OpenFlow packet transmission scheme.

In the router of FIG. 3, a routing processor 310 and a forwarding processor 330 are separated, unlike the router of FIG. 1.

An OpenFlow controller 300 includes the routing processor 310 and a DB 312.

An OpenFlow switch 320 includes the forwarding processor 330 and a DB 332.

The routing processor 310 generates a routing table. The DB 312 stores a generated routing table. The OpenFlow controller 300 transfers packet control information for controlling a packet to the OpenFlow switch 320 using an OpenFlow protocol 315. The OpenFlow switch 320 that receives the packet control information stores packet control information in a Rule-Action table 334.

Figure 4:
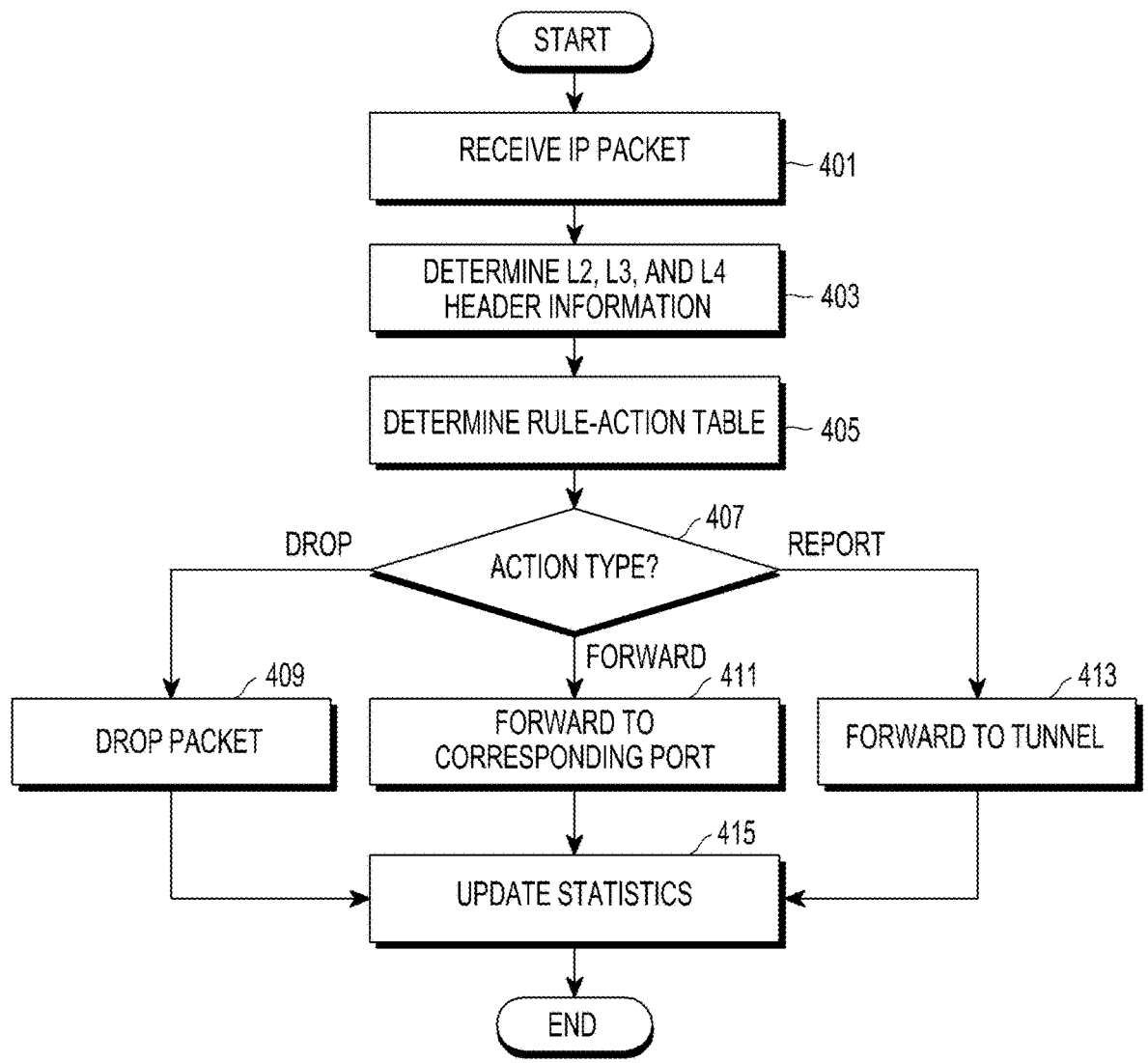
FIG. 4 is a flowchart illustrating a process of processing an IP packet by a router that supports an OpenFlow packet transmission scheme.

FIG. 4 is a flowchart illustrating a process of processing an IP packet by a router that supports an OpenFlow packet transmission scheme.

The forwarding processor 330 described hereinafter can be construed as a controller or a processor that performs the operations of FIG. 4.

The forwarding processor 330 receives an IP packet in operation 401. Subsequently, the forwarding processor 330 determines IP packet header information (hereinafter referred to as an "IP packet header") of the received IP packet in operation 403. The forwarding processor 330 extracts header information, such as a destination/source MAC address, a destination/source IP address, and a destination/source TCP port number, and the like through an IP packet header.

The forwarding processor 330 determines whether the extracted header information is identical to Rule information written in a Rule-Action table 334 in operation 405. When the extracted header information is different from the Rule-Action table 334, the OpenFlow controller 300 may forward the received packet to the forwarding processor 330, and may forward the received packet to a predetermined physical port or discard the same based on the determination of the OpenFlow controller 300.

When the extracted header information is identical to the Rule-Action table 334, the forwarding processor 330 may identify and/or determine an Action type of the Rule-Action table 334 in operation 407.

The forwarding processor 330 performs flow control and forwarding based on Action information (or an Action type). When the Action type indicates "drop", the forwarding processor 330 drops a packet in operation 409.

When the Action type indicates "forward", the forwarding processor 330 forwards the received packet to a single physical port or a plurality thereof in operation 411.

When the Action type indicates "report", the forwarding processor 330 forwards the received packet to the OpenFlow controller 300 to report the same in operation 413. The forwarding processor 330 proceeds with operation 415, and updates statistics of completely executed functions of operations 409, 411, and 413.

As a technology for application data communication between terminals in a network that supports the above-described routing and forwarding, an application data communication technology using a TCP/IP-based socket interface may be used. Hereinafter, the application data communication technology using a TCP/IP-based socket interface will be described.

Figure 5:
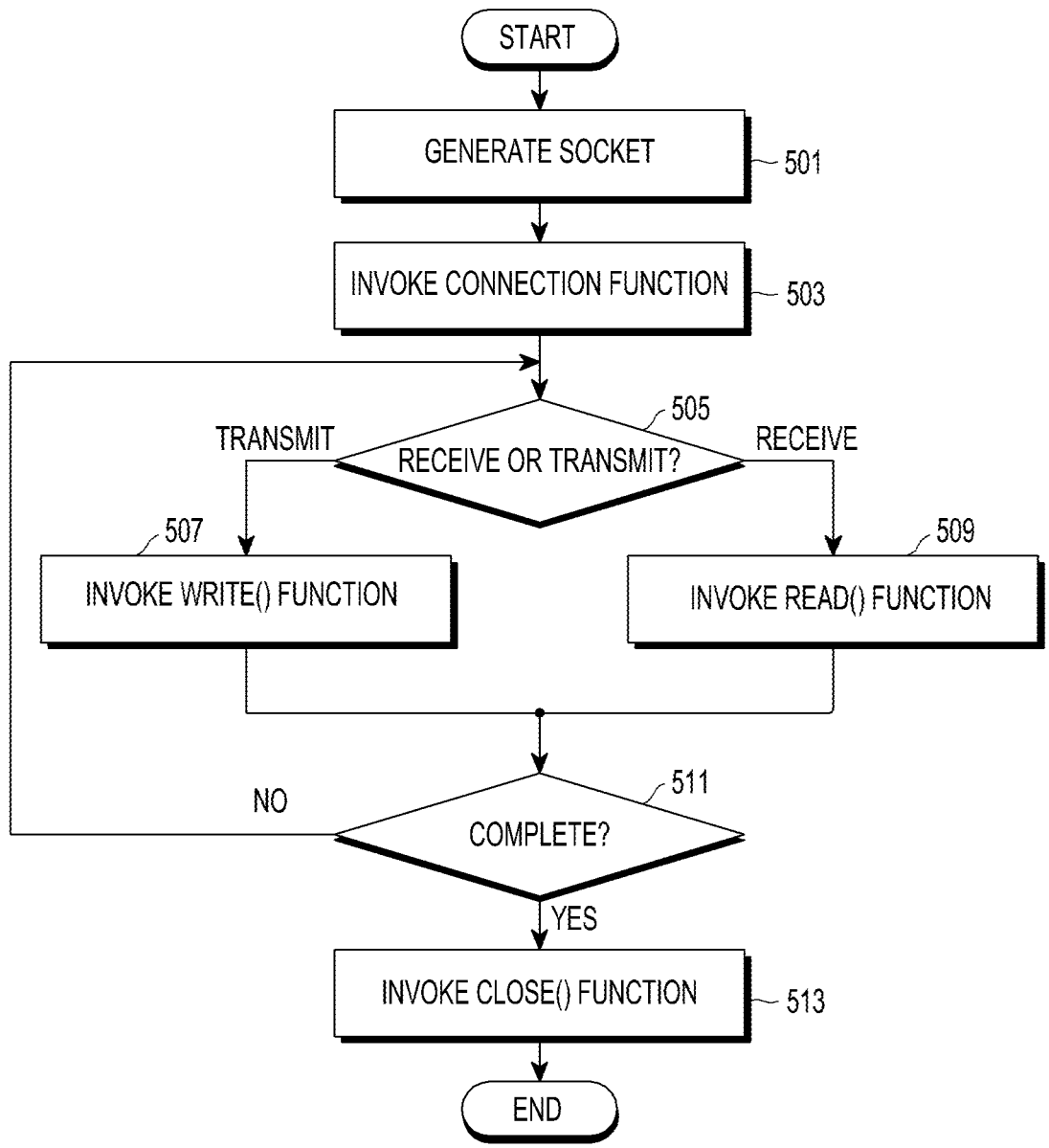
FIG. 5 is a flowchart illustrating a process of generating/transmitting and receiving an IP packet of an IP application.

FIG. 5 is a flowchart illustrating a process of generating/transmitting and receiving an IP packet of an IP application.

The operations of FIG. 5 are performed by a terminal that supports a TCP/IP protocol. An IP application invokes a socket( ) function and generates a socket for IP communication in operation 501. The IP application invokes a terminal connection function (connection( ) function) to attempt to connect to a remote host in operation 503.

The IP application determines whether data is to be transmitted to or received from the remote host in operation 505.

When it is determined that the data is to be transmitted to the remote host, the IP application invokes a write( ) function and requests data transmission from a TCP/UDP layer in operation 507. As shown in operation 511, when no data to be transmitted exists, the IP application invokes a close( ) function to terminate the connection with the remote host, which has been set up, in operation 513.

When it is determined that data is to be received from the remote host, the IP application invokes a read( ) function and requests a TCP/UDP layer to extract and receive data of the IP application from an IP packet received from the remote host in operation 509. Subsequently, as shown in operation 511, when reception of data is not desired any longer or no data to be received exists, the IP application invokes a close ( ) function to terminate the connection with the remote host, which has been set up, in operation 513.

Figures 6, 7:
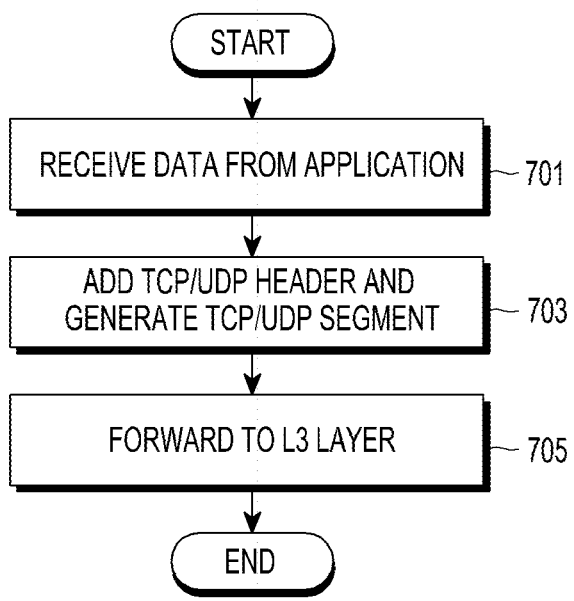
FIG. 6 is a diagram illustrating an example of a socket-control-related program code of an IP-based application, which has been described in FIG. 5.
FIG. 7 is a flowchart illustrating a process of transmitting a TCP/UDP segment in a TCP/UDP layer.

FIG. 6 is a diagram illustrating an example of a socket-control-related program code of an IP-based application, which has been described with reference to FIG. 5.

The diagram 610 illustrates an example of a socket( ) function in operation 501 of FIG. 5.

The diagram 620 illustrates an example of a connection function in operation 503 of FIG. 5.

FIG. 7 is a flowchart illustrating a process of transmitting a TCP/UDP segment in a TCP/UDP layer.

The TCP/UDP layer (Layer 4) receives data from an IP application in operation 701.

The TCP/UDP layer generates a TCP/UDP segment by adding a TCP/UDP header to the received data in operation 703. The TCP/UDP layer forwards the generated segment to an IP layer (Layer 3) in operation 705.

Figure 8:
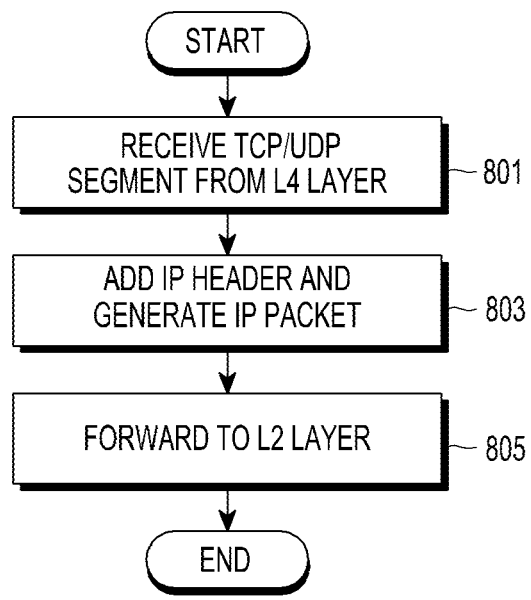
FIG. 8 is a flowchart illustrating a process of transmitting an IP packet in an IP layer.

FIG. 8 is a flowchart illustrating a process of transmitting an IP packet in an IP layer.

The IP layer receives a TCP/UDP segment from a TCP/UDP layer in operation 801.

The IP layer generates an IP packet by adding an IP header to the TCP/UDP segment in operation 803.

The IP layer transfers the generated IP packet to Layer 2, such as Wi-Fi or Long Term Evolution (LTE), in operation 805.

Figure 9:
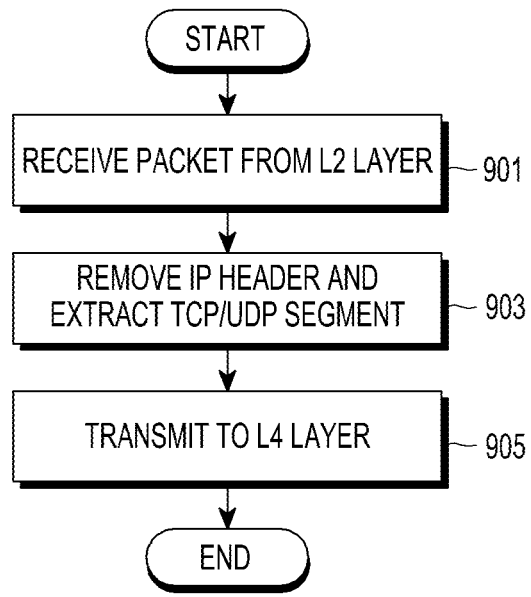
FIG. 9 is a flowchart illustrating a process of receiving an IP packet in an IP layer.

FIG. 9 is a flowchart illustrating a process of receiving an IP packet in an IP layer.

The IP layer (Layer 3) receives an IP packet of a remote host from Layer 2, such as Wi-Fi or LTE, in operation 901. That is, the IP layer receives, from Layer 2, an IP packet which is extracted by removing a frame header from an L2 frame. The IP layer that receives the IP packet extracts a TCP/UDP segment by removing an IP header in operation 903, and transfers the segment to a TCP/UDP layer in operation 905.

Figure 10:
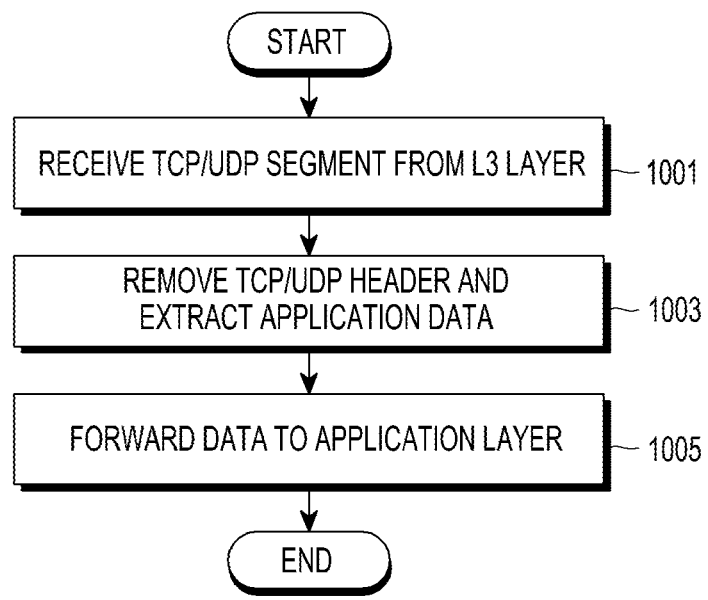
FIG. 10 is a flowchart illustrating a process of receiving a TCP/UDP segment in a TCP/UDP layer.

FIG. 10 is a flowchart illustrating a process of receiving a TCP/UDP segment in a TCP/UDP layer.

The TCP/UDP layer receives a TCP/UDP segment from an IP layer in operation 1001. The TCP/UDP layer that receives the TCP/UDP segment from the IP layer extracts application data by removing a TCP/UDP header in operation 1003. The TCP/UDP layer transfers the application data to an IP application in operation 1005.

A router supports IP networking, whereby end terminals can communicate in a global network. However, an IP address in the IP networking is only used as unique identification of a terminal in a global network. Therefore, the IP address merely supports packet transmission, but has difficulty in supporting multimedia and interactive communication service. Furthermore, a service is not recognized using only an IP address in an environment where various application services are provided, and thus it is not allowed to provide supplementary service in the network. Also, a router integrates a control plane and a data plane into a single device and each router has different control plane information from the others and operates independently. Therefore, the structure of a router makes it difficult to introduce a new networking protocol. Also, the router uses a full distribution-based routing algorithm and protocol, and thus a network operator cannot directly define a routing policy. A user and an Internet service provider cannot manage the routing policy, and cannot determine static/dynamic information of the network.

As a technology that supplements the technical drawback of the conventional router technology, OpenFlow may be used, which is implemented by a Software Defined Networking (SDN) technology. A router has a fully distributed control plane structure, whereas OpenFlow has a centralized control plane structure. Also, the router identifies a physical port to which a packet is to be forwarded and forwards the packet using only a destination IP address. Conversely, OpenFlow forwards a packet using various pieces of field information, such as a destination/source MAC address, a destination/source IP address, a destination/source TCP port number, and the like, and may perform packet forwarding, packet discard, and the like using a controller. A technical feature of the OpenFlow enables an OpenFlow controller to provide a packet control command to OpenFlow switches, which are under the control of the OpenFlow controller, whereby programmable control with respect to the flow of a packet may be performed. Also, unlike the router, the OpenFlow controller forwards a packet using various pieces of field information, such as a destination/source MAC address, a destination/source IP address, a destination/source TCP port number, and the like, and thus detailed flow control may be performed.

In association with a drawback of a conventional SDN/OpenFlow technology, OpenFlow provides a more detailed and programmable flow control than that of the router, but this is limited to IP packet forwarding and flow control. Therefore, like the router, OpenFlow may not be capable of providing a new network layer and protocol different from an IP protocol. Specifically, OpenFlow may be incapable of providing network programmability, which can generate and perform a network function by a network operator/Internet service provider/user. Also, OpenFlow makes it possible to control flow only by a network operator, but does not make it possible for an Internet service provider and a user to control the flow. OpenFlow only increases a counter every time OpenFlow processes a packet corresponding to a flow written in a Rule-Action table, but is incapable of collecting static state information and dynamic state information of a network. Furthermore, an OpenFlow switch requires complex Deep Packet Inspection (DPI) to control a plurality of flows, and thus the performance may deteriorate from the perspective of packet forwarding. Also, when the OpenFlow switch receives a plurality of packet flows which do not exist in the Rule-Action table, the performance deteriorates. The OpenFlow switch receives a plurality of packet flows that do not exist in the Rule-Action table, generates a plurality of Packet-In messages, and transmits the same to the OpenFlow controller. In this instance, frequent Packet-In message transmission may increase the load on an interface between the OpenFlow switch and the OpenFlow controller, and thus the transmission of a Packet-Out message from the OpenFlow controller to the OpenFlow switch may be delayed. The delay of the Packet-Out message transmission leads to a delay of updating the Rule-Action table of the OpenFlow switch, whereby the packet forwarding time increases.

First of all, the drawbacks of the conventional router technology are summarized as follows.

First, it supports only an IP network protocol. IP is a 40-year-old protocol, which aims to have "survivability". Therefore, from the perspective of performance and functionality, it may not appropriately support the current Internet, which mainly provides media and interactive communication services. It entails difficulty in adopting a new networking protocol, in addition to an IP.

Second, it has a fully distributed control structure, and thus, even a network operator cannot directly define a routing policy. Therefore, it is natural that a user/Internet service provider cannot manage the routing policy, and the user/Internet service provider implements its service without knowing static/dynamic information of a network.

Third, it supports only packet transmission. That is, it merely aims at transferring a packet between terminals, and is incapable of recognizing a service and providing a supplementary service. Also, it is natural that a user/Internet service provider is incapable of directly putting its desired functionality to a network.

Subsequently, the drawbacks of the conventional SDN/OpenFlow are summarized as follows.

First, it supports programmability from the perspective of a flow in which a network operator determines a path through which a packet is to be transmitted, which is the drawback that the conventional router technology fails to overcome. However, it does not support programmability from the perspective of a flow in which a user/Internet service provider determines a path of a packet belonging to the service of the user/Internet service provider.

Second, it still does not support a technology that implements a functionality desired by a network operator and a user/Internet service provider in a network and utilizes the same in a service, which is the drawback that the conventional router technology fails to overcome.

Third, a network operator has difficulty in concretely recognizing a dynamic/static state of a network and a user/Internet service provider is incapable of concretely recognizing a dynamic/static state of a network, which is the drawback that the conventional router technology fails to overcome.

Fourth, a load of implementing a DPI functionality for analyzing packet header information rapidly increases compared to the conventional router scheme, which is a drawback that has newly arisen as the SDN/OpenFlow technology has been adopted.

Fifth, a load is newly generated on an interface between an SDN controller and OpenFlow switch, which are centralized, and a processing load of a network and a controller/switch may be caused, which is a drawback that has newly arisen as the SDN/OpenFlow technology has been adopted.

The present invention is to overcome the above-described drawback of the router and the SDN/OpenFlow. The present invention proposes a function-based network, which enables a network operator/Internet service provider/user to directly and quickly employ a new network functionality for a network device.

The present invention executes a function of a network device using a smart packet (SmartPacket) that is capable of invoking a function of a network functionality, thereby providing a new network function and protocol, in addition to an IP protocol, and providing a new network service.

Also, the present invention enables a network operator/Internet service provider/user to obtain static/dynamic information of a network using a smart packet including function execution information, thereby readily managing a network.

Figure 11:
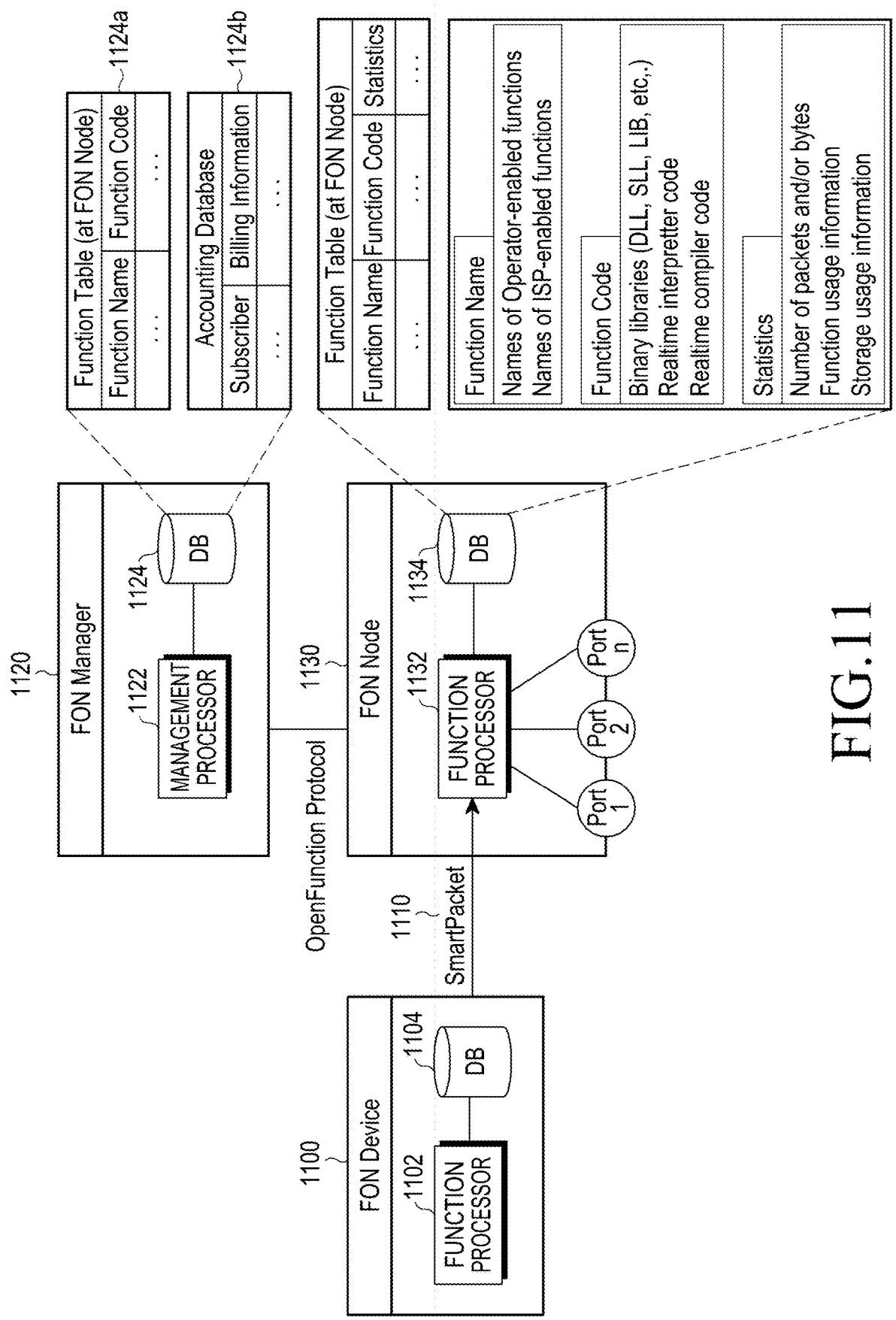
FIG. 11 is a diagram illustrating the structure of a mobile communication system for generating a packet according to an embodiment of the present invention.

FIG. 11 is a diagram illustrating the structure of a mobile communication system for generating a packet according to an embodiment of the present invention.

Referring to FIG. 11, a mobile communication system includes a Function-Oriented-Network (FON) device 1100, a FON node 1130, and a FON manager 1120.

The FON device 1100 includes a DB 1104 for storing a function table which includes a function name and a function code, and a function processor 1102 for generating a smart packet 1110, transmitting the same to a FON node, and receiving a smart packet from the FON node. The smart packet 1110 indicates a function-based packet, and does not include an IP address.

The function processor 1102 executes a function written in a function invocation field of the smart packet 1110 received from the FON node 1130. Also, the function processor 1102 receives a function distribution message from the FON manager 1120, stores function table information of the FON manager 1120 included in the function distribution message in the function table of the FON device 1100, and performs updating. The function processor 1102 may verify the smart packet 1110 using a function table stored in the DB 1104 when generating the smart packet 1110.

Figure 15:
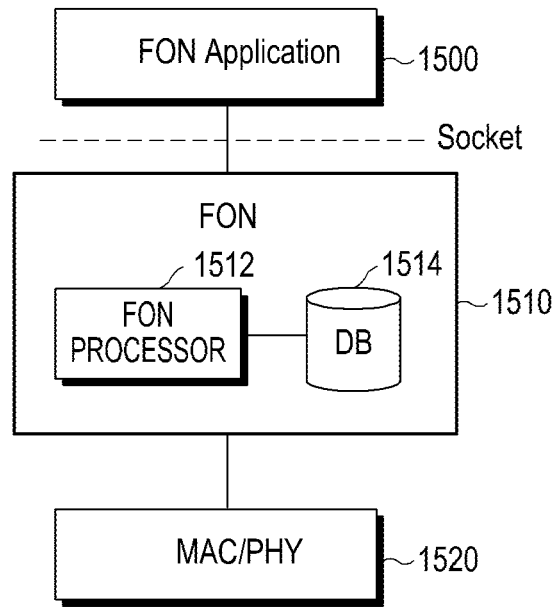
FIG. 15 is a diagram illustrating the detailed structure of a FON device according to an embodiment of the present invention.
Figure 16:
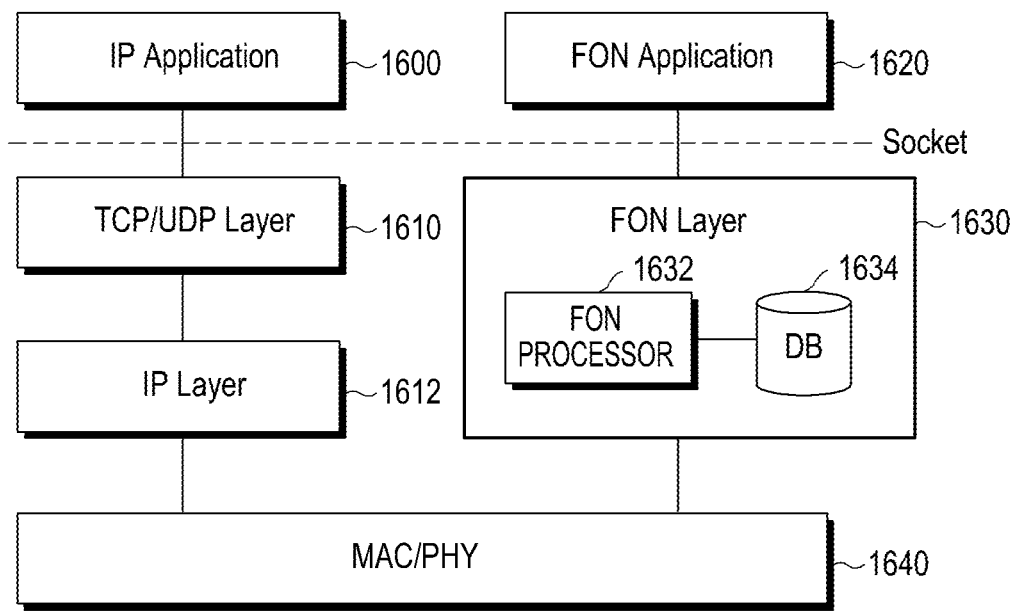
FIG. 16 is a diagram illustrating another detailed structure of a FON device according to an embodiment of the present invention.

The detailed descriptions of a FON device will be provided with reference to FIGS. 15 and 16.

The FON node 1130 includes a DB 1134 for storing a function table which includes an executable function name, a function code, the number of times that a function is used, statistical information, and a function processor 1132 for receiving a smart packet, extracting information associated with a function invocation field, and invocating and executing a function corresponding to a function name. The function processor 1132 extracts a desired function code from the DB 1134 and executes dynamic binding, and executes dynamically bound function. Also, the function processor 1132 writes a function execution result in a payload of a smart packet, and transmits the smart packet to another FON device or FON node. The function processor 1132 receives a function distribution message from the FON manager 1120, stores function table information of the FON manager 1120 included in the function distribution message in the function table of the FON node 1130, and performs updating. Also, the function processor 1132 transfers the function distribution message received from the FON manager to a FON device, whereby the FON manager can transmit the function distribution message to the FON device. When the function processor 1132 is requested, by the FON device 1100, to execute a function which does not exist in the function table, the function processor 1132 requests a function code of the function that does not exist in the function table from the FON manager 1120, and receives the function code from the FON manager 1120. The function processor 1132 receives a function deletion message from the FON manager 1120, deletes function name information and function code information included in the function deletion message from the function table, and cancels dynamic binding for the corresponding function. The function processor 1132 receives a function addition message from the FON manager 1120 and adds function name information and function code information included in the function addition message to the function table. The function processor 1132 manages a function table stored in the DB 1134, and reports function usage information for each user to the FON manager 1120.

The FON manager 1120 includes a DB 1124 of a function table 1124a including an executable function name and a function code, and an accounting table 1124b which manages billing information based on user (subscriber) information and function usage information for each user. Also, the FON manager 1120 includes a management processor 1122, which extracts the function table 1124a from the DB 1124 and transmits the same to the FON device 1100 or the FON node 1130. The management processor 1122 may add a new function, which is executable in the FON node 1130, to the function table of the FON manager 1120, and may transmit a function addition message to the FON node 1130, whereby function name information and function code information may be added to the function table of the FON node 1130. The management processor 1122 transmits a function deletion message to the FON node 1130, whereby predetermined function name information and function code information may be deleted from the function table stored in the FON node 1130.

The management processor 1122 receives a function code request from the FON node 1130, extracts a function code from the function table 1124a of the DB 1124, and transfers the extracted function code. The management processor 1122 receives function usage information for each user from the FON node 1130, calculates billing information based on the function usage information for each user, and stores/manages the corresponding information in the accounting table 1124b.

The management processor 1122 transmits a function distribution message to the FON node 1130, and distributes the function table of the FON manager 1120 to the FON device 1100 or the FON node 1130.

The FON device 1100 may be applied to user equipment, a sensor, a desktop computer, a tablet computer, a notebook, or the like, which uses wireless transmission technologies, such as LTE, WiMAX, Wi-Fi, Bluetooth, ZigBee, and the like, and wired transmission technologies, such as Ethernet and the like.

The FON node 1130 may be applied to a router, a switch, a Wi-Fi Access Point (Wi-Fi AP), an evolved NodeB (eNB), a Packet Data Network Gateway (PGW), a Serving Gateway (SGW), a Home-evolved NodeB (HeNB), a Femtocell Gateway (FGW), and the like, and may exist as an independent device.

The FON manager 1120 may be applied to a Mobility Manager Entity (MME), an OpenFlow controller, a Simple Network Management Protocol (SNMP) manager, and the like, and may exist as an independent device.

Figure 12:
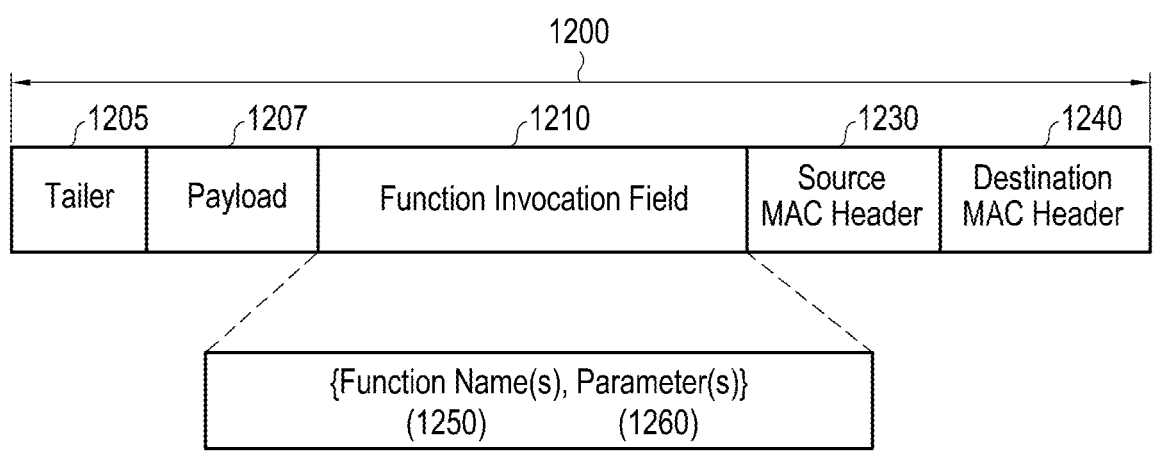
FIG. 12 is a diagram illustrating the structure of a smart packet according to an embodiment of the present invention.

FIG. 12 is a diagram illustrating the structure of a smart packet according to an embodiment of the present invention.

A smart packet 1200 of FIG. 12 includes a trailer 1205, a payload 1207, a function invocation field 1210, a source MAC header 1230, and a destination MAC header 1240. A function invocation field 1210 may include an IPv4/IPv6 address (hereinafter referred to as an "IP address") 1250, a TCP/UDP port number 1260, and the like. That is, to provide compatibility with an IP network in consideration of an IP protocol and stack structure, the IPv4/IPv6 address may be selectively included in the function invocation field. When a network is not the IP network, the IPv4/IPv6 address may not be included.

The function invocation field 1210 may include function name information of a function desired to be invoked, and may include a plurality of pieces of function name information. Also, an input parameter and an output parameter of a function desired to be invoked may be inserted into a payload.

Figure 13:
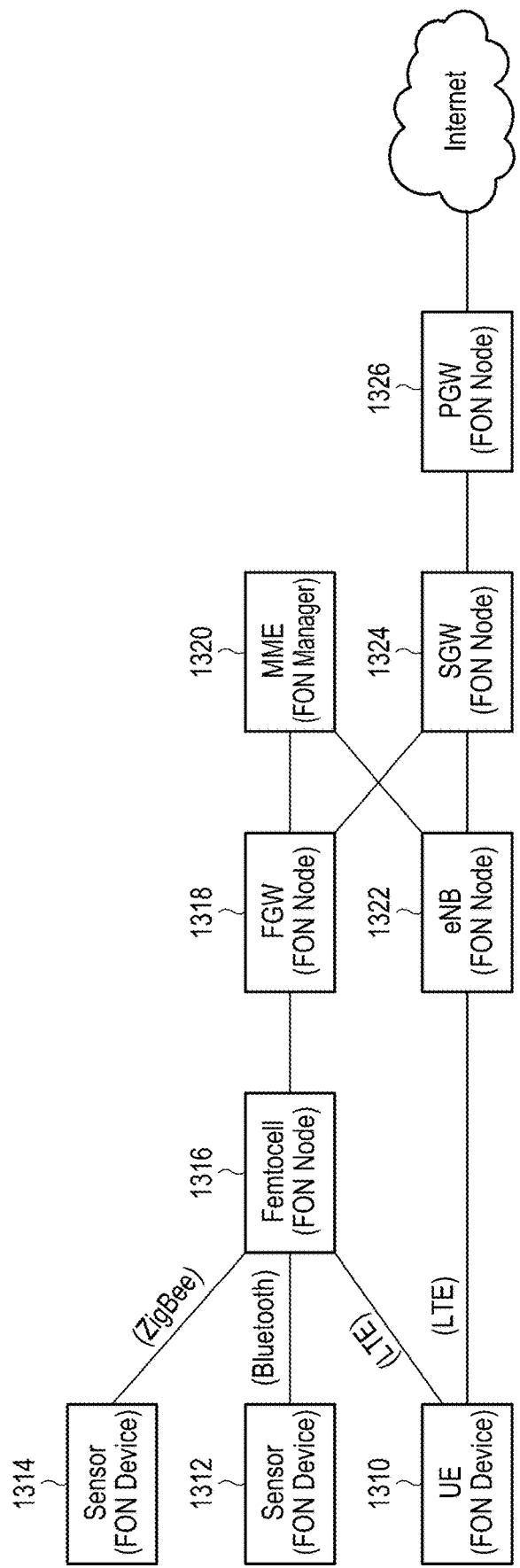
FIGS. 13 and 14 are diagrams illustrating examples of a network configuration according to the present invention.
Figure 14:
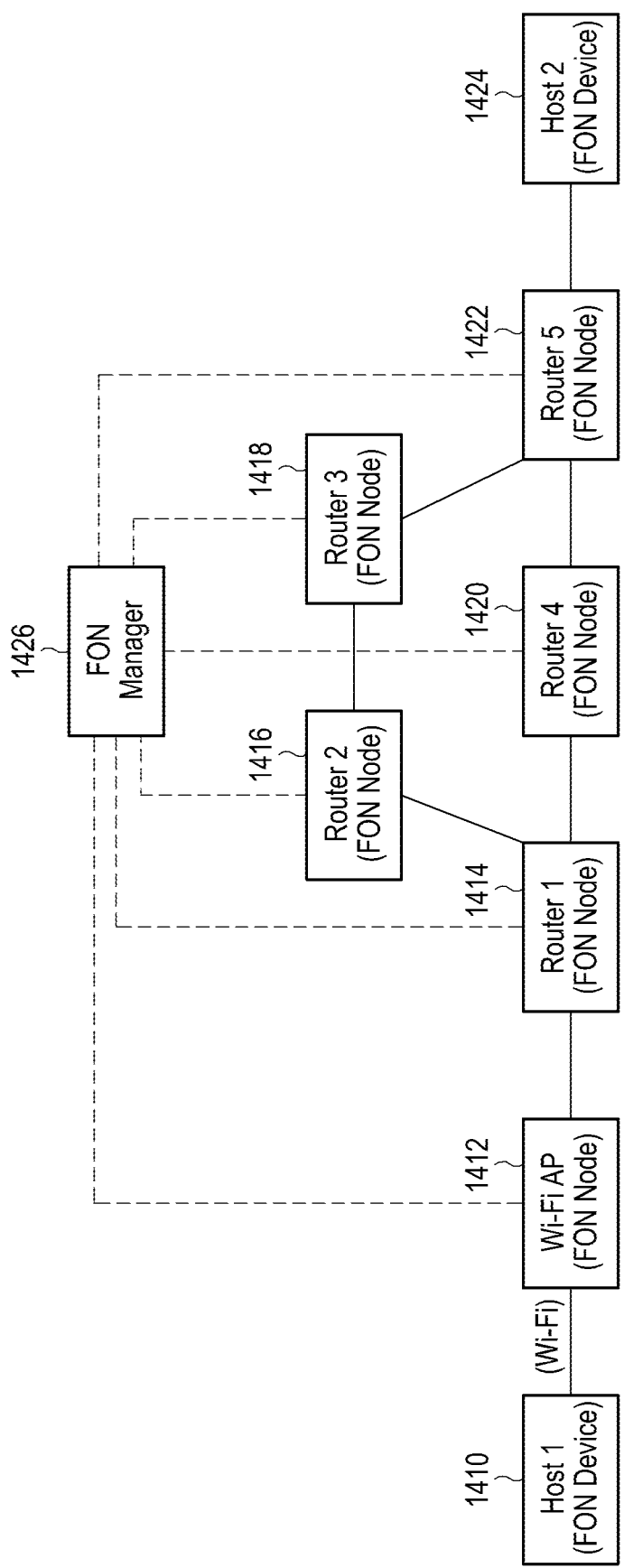

FIGS. 13 and 14 are diagrams illustrating examples of a network configuration according to the present invention.

FIG. 13 illustrates a mobile communication network structure according to the present invention. FIG. 14 illustrates a wired/wireless network structure according to the present invention.

As illustrated in FIG. 13, a FON device is applied to sensors 1312 and 1314 and user equipment (UE) 1310. The sensors 1312 and 1314 communicate with a femtocell base station (BS) 1316 using a transmission technology such as Bluetooth or ZigBee, and the UE 1310 communicates with the femtocell BS 1316 or an eNB 1322 using a transmission technology such as LTE. A FON node is applied to the femtocell BS 1316 of FIG. 13, and the femtocell BS 1316 supports, for example, all of the Bluetooth/ZigBee/LTE/LTE-A transmission technologies. A FON node is applied to the eNB 1322 and the eNB 1322 supports, for example, the LTE or LTE-A transmission technology.

A FON node is applied to an FGW 1318, the eNB 1322, a serving gateway (SGW) 1324, and a packet data network gateway (PGW) 1326, and a Mobile Mobility Entity (MME) 1320 may have a structure to which a FON manager is applied.

A FON device is applied to Host 1 1410 of FIG. 14, and Host 1 1410 communicates with a Wi-Fi AP 1412 using a wireless transmission technology, such as Wi-Fi. A FON device is applied to Host 2 1424, in the same manner as Host 1 1410, and Host 2 1424 may communicate with router 5 1422 using a wired transmission technology, such as Ethernet. A FON node is applied to the Wi-Fi AP 1412 and router 1 to 5 1414, 1416, 1418, 1420, and 1422, and the FON manager 1426 may exist as an independent device, as described above.

FIG. 15 is a diagram illustrating a detailed structure of a FON device according to an embodiment of the present invention.

FIG. 15 is a diagram illustrating a detailed structure of a FON-dedicated device.

Referring to FIG. 15, in a FON device, a Function-Oriented-Network (FON) layer 1510 including a FON processor 1512 and a DB 1514 is located above a MAC/PHY layer 1520, and a FON application 1500 is located above the FON layer 1510.

The FON application 1500 may transmit data of the FON application 1500 to the FON layer 1510 using a socket interface.

FIG. 16 is diagram illustrating another detailed structure of a FON device according to an embodiment of the present invention.

FIG. 16 illustrates a structure of FON/IP device that simultaneously supports a FON application and an IP application.

A TCP/UDP layer 1610 and an IP layer 1612 for an IP-based application are located above a MAC/PHY layer 1640. A FON layer 1630 including a FON processor 1632 and a DB 1634 may be located in a location equivalent to that of the IP layer 1612 and the TCP/UDP layer 1610.

The IP-based application 1600 transmits data using an IP-based socket interface. Conversely, the FON-based application 1620 transmits data using a FON-based socket interface. For compatibility with an existing IP-based application and ease of development, the FON-based socket interface may be embodied by correcting the IP-based socket interface.

A process of generating/transmitting and receiving an IP packet in a FON device is the same as the conventional application data communication method between terminals, which has been described with reference to FIGS. 5, 6, 7, 8, 9, and 10. The existing service is supported without change in the interest of compatibility.

Figure 17:
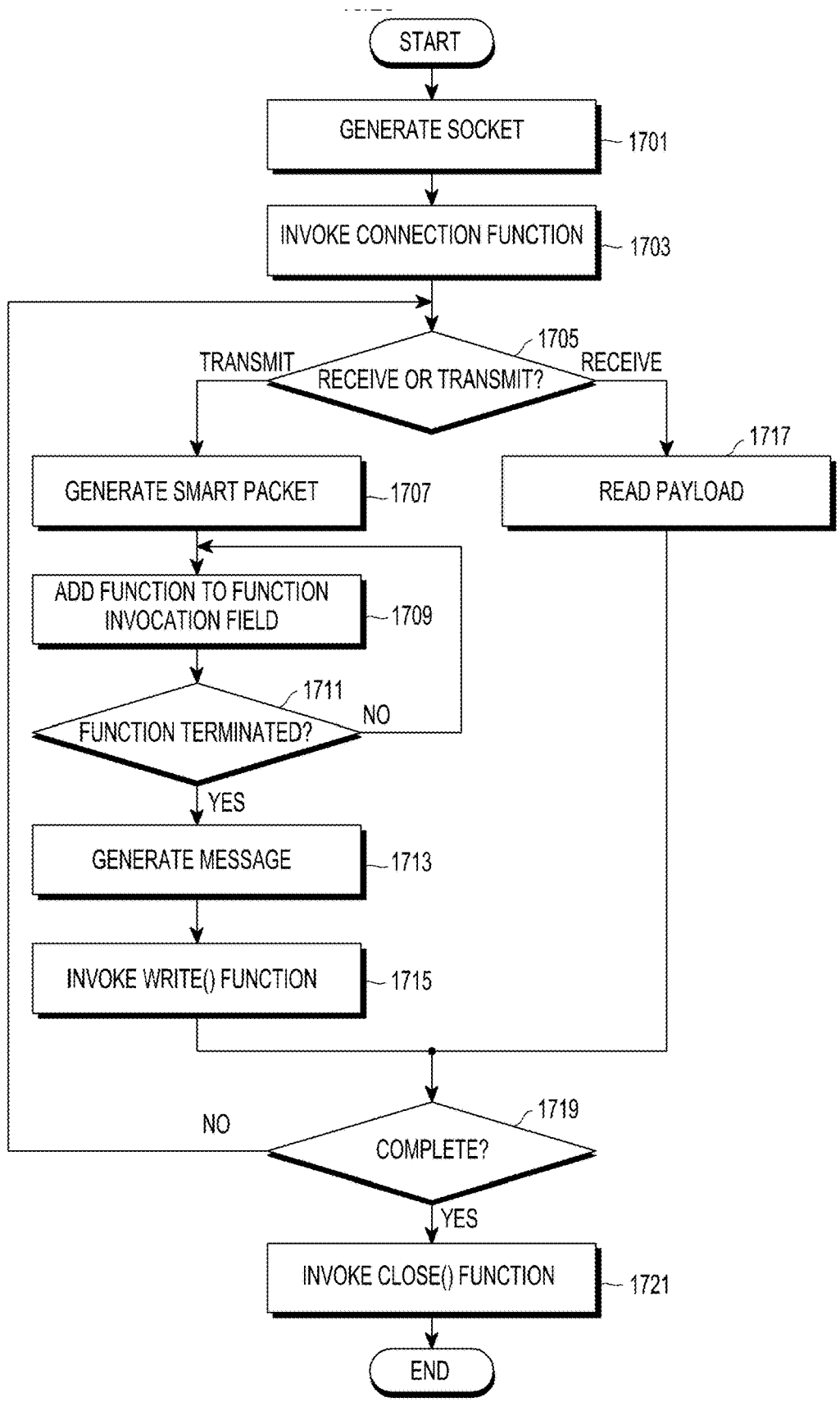
FIG. 17 is a flowchart illustrating a process of generating/transmitting and receiving a smart packet in a FON application.

FIG. 17 is a flowchart illustrating a process of generating/transmitting and receiving a smart packet in a FON application.

The process is performed when a FON/IP device or a FON-dedicated device generates/transmits and receives a smart packet. The FON/IP device or FON-dedicated device invokes a socket( ) function, and generates a socket for FON communication in operation 1701.

The FON/IP device or the FON-dedicated device invokes a connection( ) function and attempts to connect to a FON node in operation 1703.

The FON/IP device or FON-dedicated device determines whether to transmit data to the FON node or to receive data from the FON node in operation 1705.

When transmission of data to the FON node is determined, the FON/IP device or FON-dedicated device invokes an spCreate( ) function and generates a smart packet in operation 1707. When the smart packet is generated, the FON/IP device or FON-dedicated device invokes a spAdd ( ) function, and adds a function desired to be executed in the FON node to a function invocation field of the smart packet in operation 1709. To additionally add a function desired to be executed in the FON node to the smart packet, the FON/IP device or FON-dedicated device repeatedly invokes a spAdd( ) function, and adds a function desired to be executed in the FON node to the function invocation field. As described, this may be executed by substituting various types of functions. An example of the various types of functions will be described with reference to FIG. 25.

When the function addition is completed, the FON/IP device or FON-dedicated device invokes an spTerminate( ) function, and completes the generation of a smart packet in operation 1711. When the generation of the smart packet is completed, the FON/IP device or FON-dedicated device invokes a write( ) function, and requests smart packet transmission from a FON layer. When data to be transmitted still exists, the FON/IP device or FON-dedicated device repeatedly invokes spCreate( ), spAdd( ), spTerminate( ), and write( ) functions, and requests data transmission from the FON layer. When data to be transmitted does not exist any longer in operation 1719, the FON/IP device or FON-dedicated device invokes a close( ) function and terminates the connection that was set up with the FON node in operation 1721.

When it is determined that data is to be received from the FON node in operation 1705, the FON/IP device or FON-dedicated device determines a payload of a received smart packet, invokes a read( ) function, and requests the FON layer to extract data of a FON application from the smart packet received from the FON node and to receive the same in operation 1717 When data reception is not desired any longer, or no data to be received exist, the FON/IP device or FON-dedicated device invokes a close( ) function and terminates the connection which has been set up with the FON node.

FIG. 18 is a diagram illustrating an example of a socket-control-related program code of a FON-based application in a FON device.

The diagram 1800 illustrates an example of a socket( ) function in operation 1701 of FIG. 17.

The diagram 1810 illustrates an example of a connection function in operation 1703 of FIG. 17.

When compared to FIG. 6, FIG. 18 is a function-based (FON) socket and an IP address (e.g., 0.102.111.110) is written in a connection function.

Figure 19:
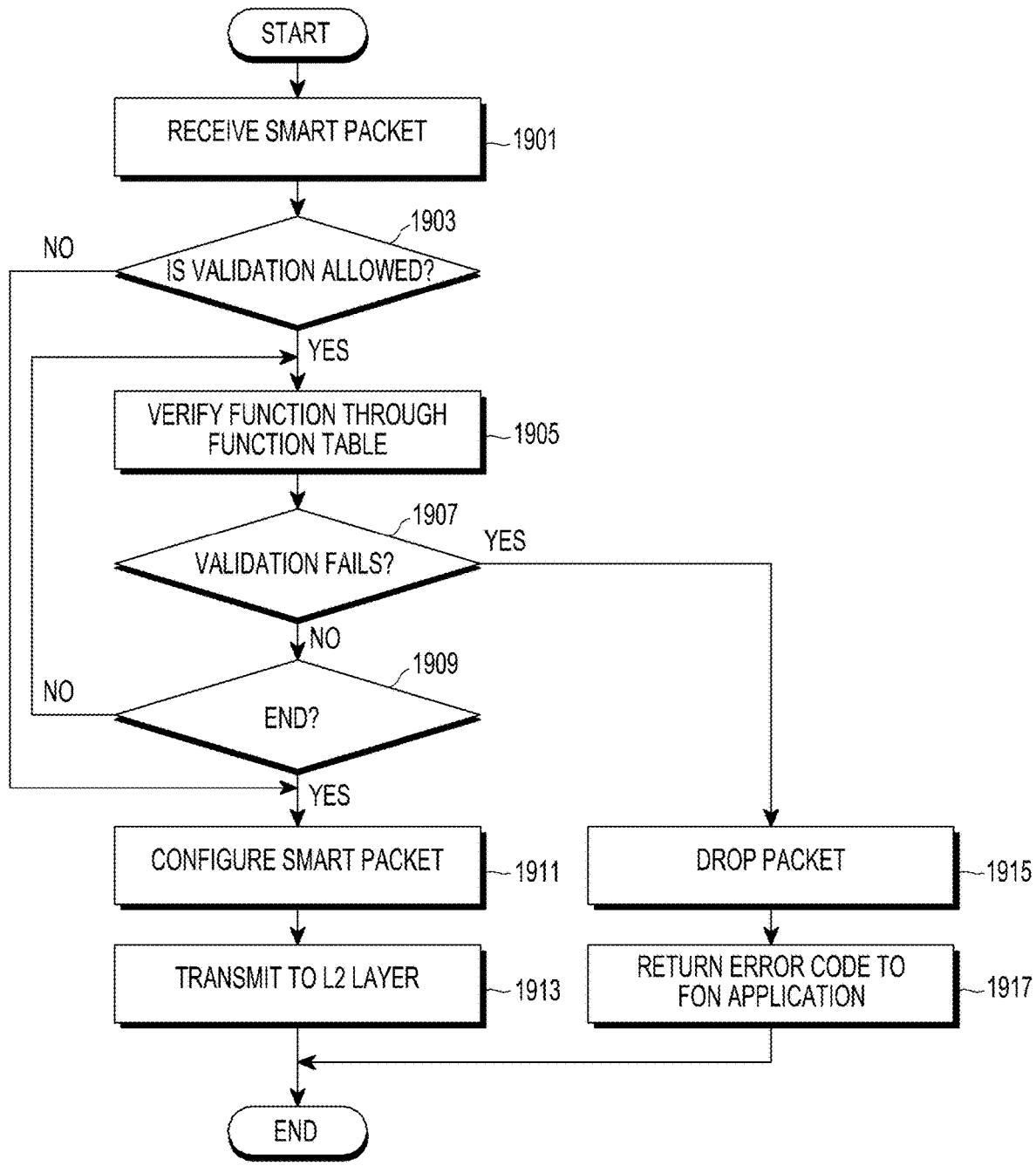
FIG. 19 is a flowchart illustrating a process of transmitting a smart packet in a FON layer.

FIG. 19 is a flowchart illustrating a process of transmitting a smart packet in a FON layer.

A FON layer receives a smart packet from a FON application in operation 1901.

When the smart packet is received from the FON application, a function processor of the FON layer additionally determines whether a FON message validation function is activated in operation 1903. The FON message validation means verifying whether a smart packet generated by a FON device is capable of executing a network function in a FON node without an error. When the FON message validation is not activated, the function processor of the FON layer configures a smart packet in operation 1911, and transfers the configured smart packet to Layer 2 in operation 1913.

When the FON validation is activated, the function processor of the FON layer verifies whether the smart packet is capable of executing a network function in the FON node without an error, using a function table included in a DB of the FON layer in operation 1905.

Figures 20, 21:
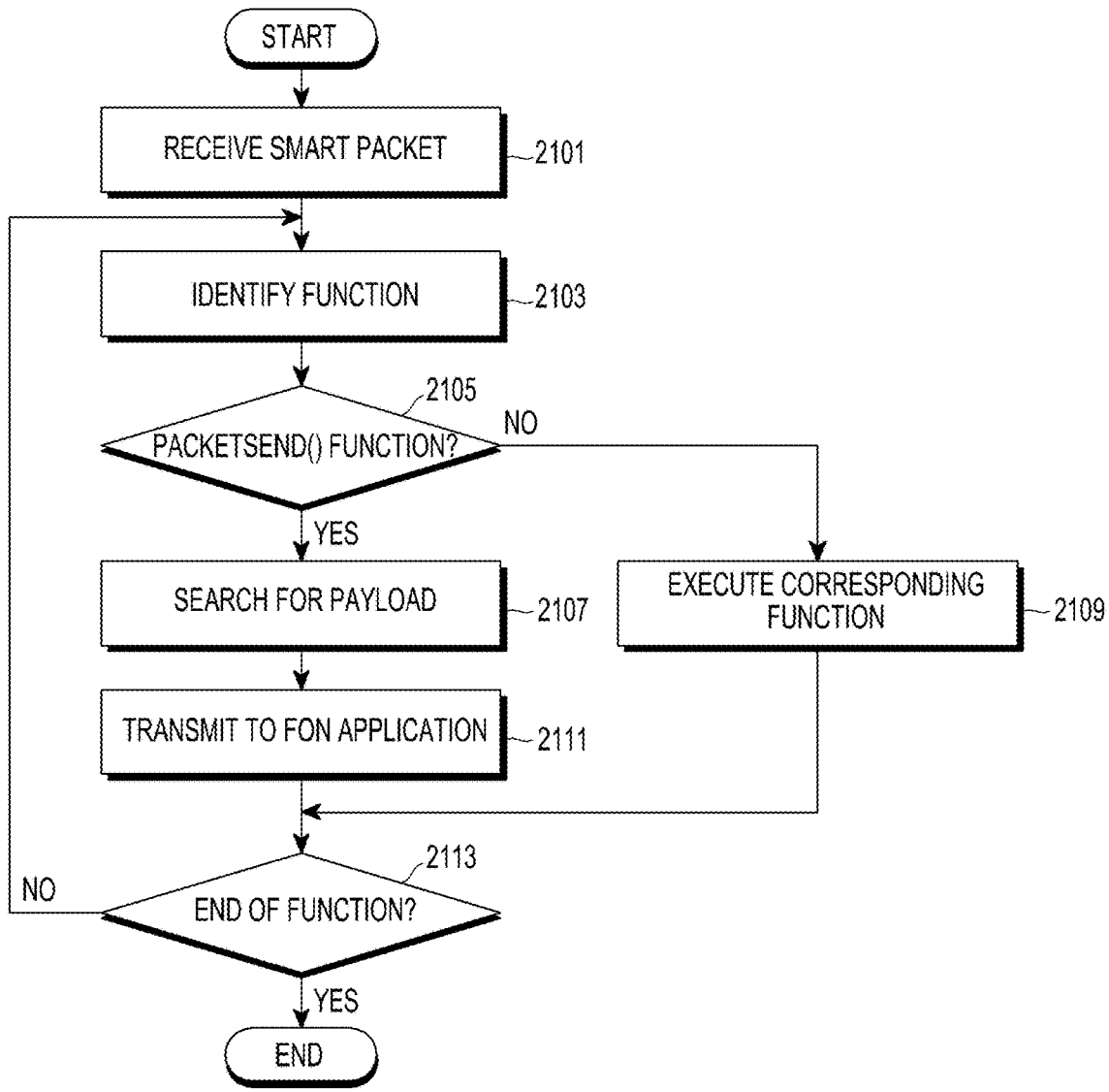
FIG. 20 is a diagram illustrating the structure of a function table stored in a DB of a FON device.
FIG. 21 is a flowchart illustrating a process of receiving a smart packet in a FON layer.

FIG. 20 is a diagram illustrating a structure of a function table stored in a DB of a FON device.

The structure 2000 of a function table includes, for example, a function name field and a function code field. The function name field includes names of functions executable in a FON node, and the function code field includes function source code for the function names. In this instance, in the case of a function that is executed in response to a request from a FON node or another FON device, source code exists. However, when a FON device invokes a functionality of another FON device or a FON node, only a function name exists, and this may be used for verifying whether the function invocation is an appropriate function invocation when a FON message is generated. The function processor of the FON layer determines whether a function written in a function invocation field of the smart packet generated by the FON application exists in the function table in operation 1907.

When the function name of the function written in the smart packet does not exist in the function table, the function processor of the FON layer discards the corresponding smart packet in operation 1915, and returns an error code to the FON application in operation 1917.

When the function name written in the smart packet exists in the function table, the function processor of the FON layer determines that the function is executable in a FON node, and repeatedly checks whether a subsequent function name written in the smart packet exists in the function table in operation 1909. When functions up to the last function written in the smart packet exist in the function table, the function processor of the FON layer may generate a smart packet including up to the last function in operation 1911, and transmits the generated smart packet to Layer 2 in operation 1913.

FIG. 21 is a flowchart illustrating a process of receiving a smart packet in a FON layer.

The FON layer receives a smart packet from Layer 2 in operation 2101.

When the FON layer receives a smart packet from Layer 2, a function processor of the FON layer extracts a function invocation field of the smart packet and searches for a function name in operation 2103. The function processor of the FON layer determines whether the retrieved function name is PacketSend( ) in operation 2105. When the function name is different from PacketSend( ), the function processor of the FON layer executes the corresponding function.

However, when the function name is PacketSend( ), the function processor of the FON layer searches for a payload of the smart packet in operation 2107. The function processor of the FON layer extracts FON application data from the retrieved payload and transfers the same to a FON application in operation 2111. The function processor of the FON layer repeats the above-described process with respect to all functions written in the function invocation field of the smart packet, and terminates a smart packet reception process when the process reaches a last function in operation 2113.

Figure 22:
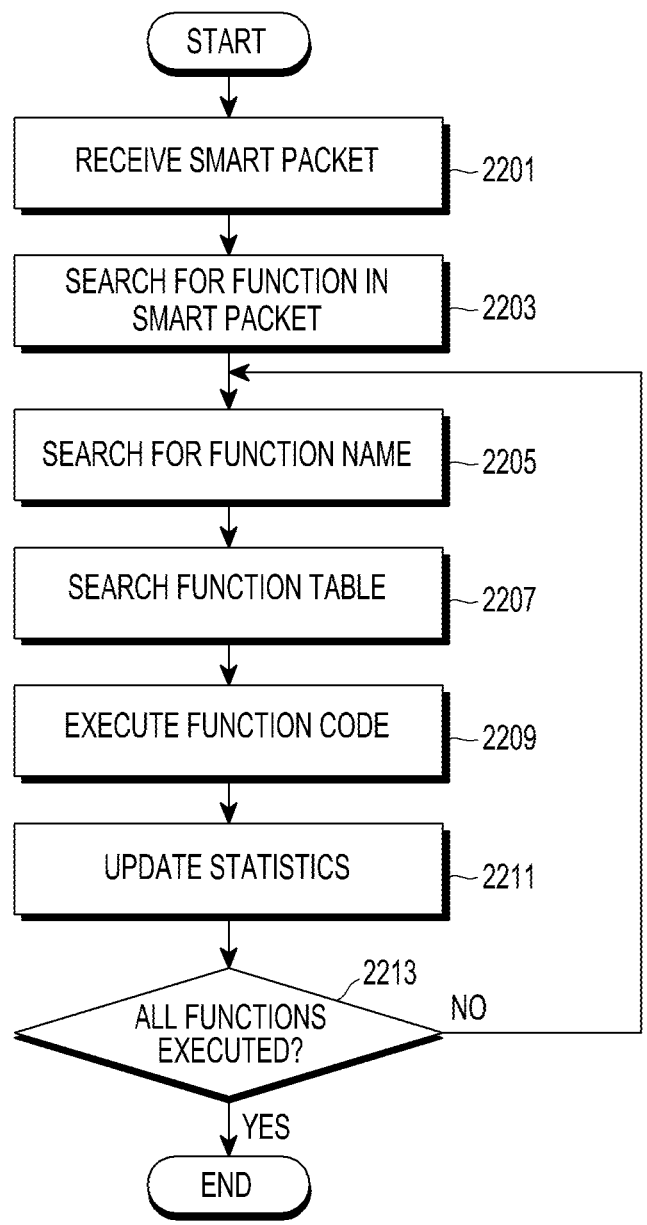
FIG. 22 is a flowchart illustrating a smart packet reception processing process in a FON node.

FIG. 22 is a flowchart illustrating a smart packet reception processing process in a FON node.

A function processor of a FON node receives a smart packet from a FON device or a FON node in operation 2201.

When the smart packet is received from the FON device or the FON node, the function processor of the FON node extracts a function invocation field of the smart packet from the received smart packet in operation 2203. The function processor of the FON node searches for a function name of a function to be executed in operation 2205. In this instance, the function processor of the FON node searches a function table stored in a DB in operation 2207. The function processor of the FON node retrieves a function code from the function table and executes the same in operation 2209. Various methods may be used for executing a function, and the function processor of the FON node may execute a function basically using dynamic binding. The function processor of the FON node compiles function codes existing in the function table stored in the DB so as to generate an execution file, and stores the generated execution file in the DB. The function processor of the FON node retrieves an execution file associated with a function written in the function invocation field of the smart packet from the DB and executes the same. Also, the function processor of the FON node may cancel dynamic binding of a function that is not executed.

Subsequently, the function processor of the FON node updates statistics of a completely executed function in operation 2211, and determines whether all functions are completely executed in operation 2213. When all functions are completely executed, the function processor of the FON node terminates operation. However, when not all functions are completely executed, the function processor of the FON node returns to operation 2205.

FIG. 23 is a diagram illustrating an example and a structure of a function table stored in a DB of a FON node.

Referring to FIG. 23, a function table 2300 includes a function name field, a function code field, and a statistics field.

The function name field includes the name of a function executable in a FON node.

The function code field includes a function source code for a function name.

The statistics field includes the number of times that a function is invoked.

When a function is completely executed, a function processor of the FON node updates the statistics field of the function table associated with the completely executed function. When the process is completely performed with respect to all functions written in a smart packet, a smart packet reception processing process of the FON node is completed.

Additionally, the function processor of the FON node identifies a FON device that sends the smart packet and transmits function usage information to a FON manager. Various methods may be used for identifying a FON device. A 4G/5G MAC address, a Wi-Fi address, a Bluetooth MAC address and the like, and a unique user ID, such as an International Mobile Subscriber Identity (IMSI), may be used to identify a FON device. Also, the processor of the FON node calculates a function name invoked by the FON device and the number of times that a function is invoked.

User identification information and function usage information may be transmitted to a FON manager using a function usage information report message shown in FIG. 24.

FIG. 24 is a format illustrating an example of a function usage information report message.

The function usage information report message is a message transmitted from a FON device to a FON manager. In FIG. 24, it is recognized that the FON device is identified using, for example, an IMSI. The function usage information report message includes function invocation information. The function invocation information may be extracted and the amount of bill may be calculated based on the number of times that a function is invoked.

FIG. 25 is a diagram illustrating an example of a list of basic functions supported by a FON node.

FIG. 25 illustrates an example of a function used in operation 1709 of FIG. 17.

By downloading a function from a FON manager, a function table of a FON node may be updated and a new function may be added. Also, by receiving a function deletion message from the FON manager, a function corresponding to a function deletion message may be deleted from the function table. Although the present invention describes the detailed operations of some functions, this may be provided as an additional invention.

The FON manager may distribute a function table stored in a DB of the FON manager to a FON device and a FON node, and a distribution process is described as follows.

When the FON manager distributes a function table to the FON device or the FON node, a management processor of the FON manager extracts the function table stored in the DB, generates a function distribution message, and transmits the generated function distribution message to the FON node, whereby the function table information of the FON manager is distributed to the FON node.

In the case of packet transportation, a used function may include PacketSend( ) PacketInsertField( ), PacketRemoveField( ), PacketAddField( ), and PacketPort( ).

PacketSend( ) is a function for transmitting a packet to a place that requests the packet. PacketInsertField( ) is a function for inserting a requested value to a predetermined location (field) of a packet. PacketRemoveField( ) is a function for removing a value of a predetermined location (field) of a packet. PacketAddField( ) is a function for inserting a requested value to a last part of a packet. PacketPort( ) is a function for reading a port number(s) to which a packet is to be transmitted.

In the case of system information retrieval, SystemRead( ) is used. SystemRead( ) is a function for reading system information of a FON node.

In the case of user information retrieval, SubscriberRRead( ) is used. SubscriberRRead( ) is a function for reading user/terminal information that accesses a FON node.

Functions required for using a user storage space include StorageAvailability( ), StorageCreate( ), StorageRead( ), StorageWrite( ), StorageRemove( ), and the like.

StorageAvailability( ) is a function for determining whether a variable requested by a user exists in a FON node.

StorageCreate( ) is a function for generating a variable requested by a user in a FON node.

StorageRead( ) is a function for reading the value of a variable generated by a user in a FON node.

StorageWrite( ) is a function for storing the value of a variable generated by a user in a FON node.

StorageRemove( ) is a function for removing a variable requested by a user from a FON node.

Functions required for executing a user functionality include MathRandom( ) and MathGetMax( ).

MathRandom( ) is a function for calculating a result value using a random function within an input range.

MathGetMax( ) is a function for comparing input values and returning a maximum value.

FIG. 26 is a diagram illustrating an example and a structure of a function distribution message according to an embodiment of the present invention.

In the structure of a function distribution message, a command property indicating the purpose of a message has a "Publication" property value, and the structure includes function name information, function code information, input parameter information, output parameter information, and target information associated with a device to which the information is to be distributed. The target information of FIG. 26 may be a FON device and a FON node.

When a Target property further includes the property value "FON Device", a FON node that receives the function distribution message written as shown in FIG. 26 transmits the function distribution message to all FON devices that communicate with the FON node, whereby a FON manager distributes function table information to the FON devices.

The FON manager provides a command to delete a predetermined function out of the functions distributed to the FON nodes, and a function deletion process is performed as follows.

When a network operator desires to delete a predetermined function from among the functions existing in a function table of a FON node, a management processor of a FON manager generates a function deletion message, transmits the same to the FON node, and deletes the predetermined function existing in the FON node.

FIG. 27 is a diagram illustrating an example and a structure of a function deletion message according to an embodiment of the present invention.

A command property indicating the purpose of a message has a "Delete" property value, and the message includes function name information, function code information, input parameter information, and output parameter information associated with a function desired to be deleted, and target information of the device on which function deletion is to be performed. The target information may include, for example, a FON device and a FON node.

A FON manager transmits a function deletion message to a FON node, and the FON node that receives the message deletes function information written in the function deletion message from a function table, whereby the FON manager deletes a predetermined function existing in the function table of the FON node.

The FON manager transmits a new function written by a network operator or a $3^{rd}$-party operator to the FON node to add the same, and a new function transmission and addition process is performed as follows.

When a network operator or a $3^{rd}$-party operator desires to add a new function to a FON node, a management processor of a FON manager generates a function addition message and transmits the message to the FON node, whereby a new function is added to a function table of the FON node.

FIG. 28 is a diagram illustrating an example and a structure of a function addition message according to an embodiment of the present invention.

A command property indicating the purpose of a message has an "Add" property value, and the message includes function name information, function code information, input parameter information, and output parameter information associated with a function desired to be added, and target information of a device on which function addition is to be performed.

The target information may include, for example, a FON device and a FON node.

A FON manager transmits a function addition message to the FON node, and the FON node that receives the same adds function information written in the function addition message to a function table of the FON node, whereby the FON manager adds a new function to the function table of the FON node.

When the FON manager receives a function usage information message from the FON node, the FON manager manages billing information based on the usage of a function, and a billing information management process is performed as follows.

When the function usage information message of FIG. 24 is received from a FON node, a management processor of a FON manager manages an accounting table stored in a DB.

Figure 29:
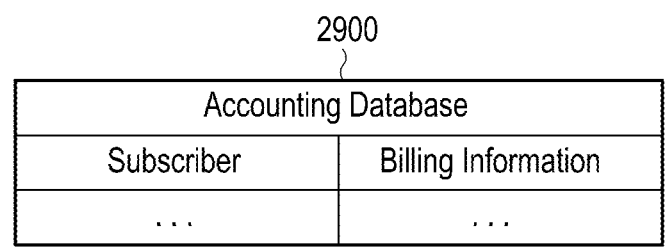
FIG. 29 is a diagram illustrating a structure of an accounting table according to an embodiment of the present invention.

FIG. 29 is a diagram illustrating the structure of an accounting table according to an embodiment of the present invention.

A management processor of a FON manager extracts FON node information from a received function usage information report message, identifies a user, and stores identified user information as a subscriber property of an accounting table 2900. The management processor of the FON manager extracts function invocation information from the function usage information report message and calculates the amount of bill based on the number of times that a function is invoked. The calculated amount of bill is stored in a billing information property of the accounting table. The above-described process is performed by the management processor of the FON manager every time a function usage information report message is received from the FON node, whereby billing information is managed based on the usage of a network function for each user.

FIGS. 26, 27, and 28 are examples provided for illustrative purpose for the present invention, and may be implemented in different languages and expressions.

As examples of a scenario that utilizes the present invention, the following four cases are considered, and a new service may become available as an additional function is proposed.

A first case is a packet transmission scenario in a D2D-based IoT communication environment on a heterogeneous network.

Figure 30:
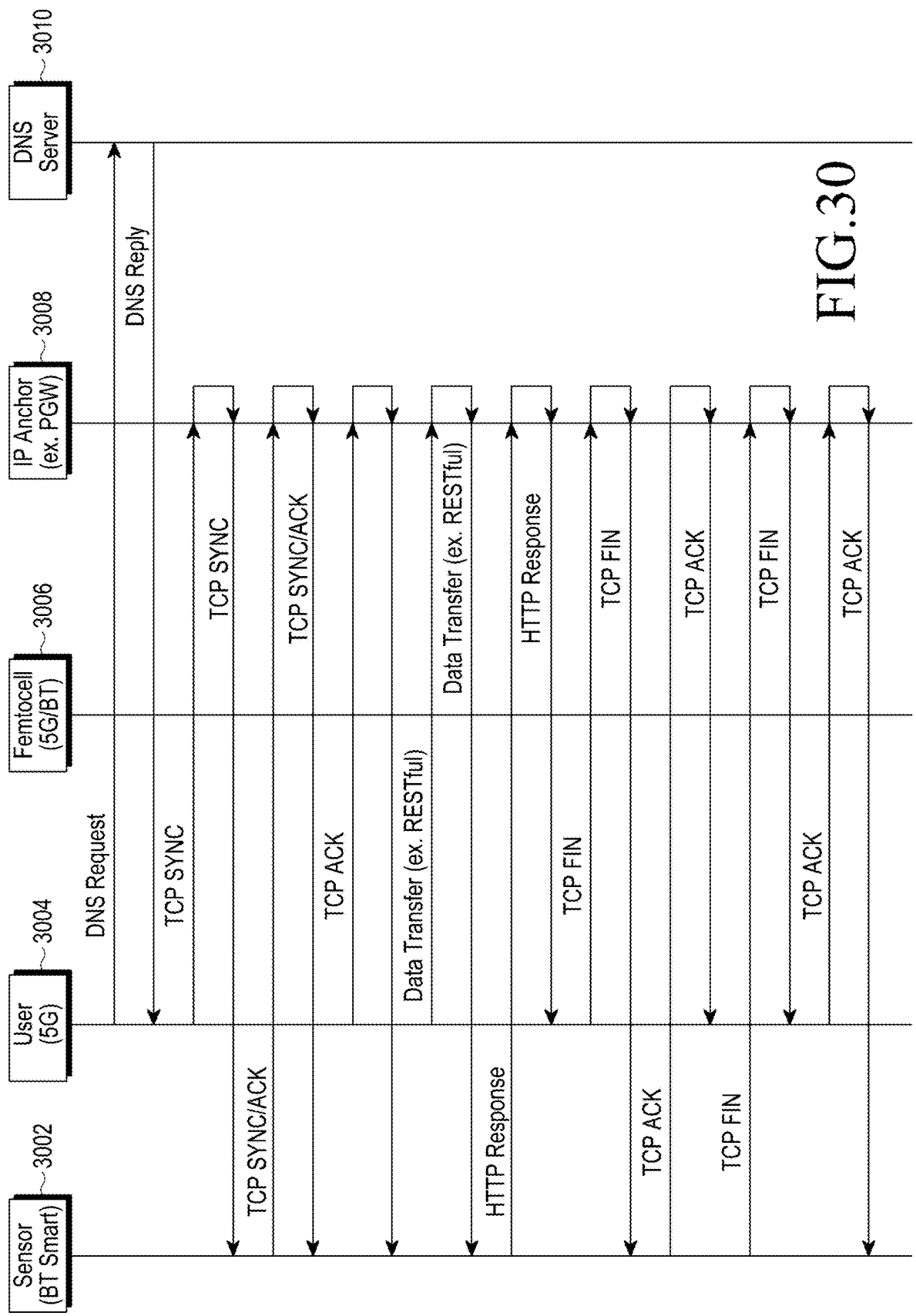
FIG. 30 is a scenario illustrating an example of data communication between a sensor and user equipment in a general 4G/5G mobile communication network.

FIG. 30 is a scenario illustrating an example of data communication between a sensor and user equipment in a general 4G/5G mobile communication network.

When a femtocell BS 3006 supports the Bluetooth transmission technology and the LTE or 5G wireless transmission technology, a sensor 3002 and a user equipment (UE) 3004 belonging to the same femtocell BS 3006 do not directly communicate, but execute Internet of Things (IoT) communication between the sensor 3002 and the UE 3004 via an IP anchor 3008, such as a PGW, and a DNS server 3010. The UE 3004 transmits a DNS request message to the DNS server 3010 via the femtocell BS 3006 and the IP anchor 3008. The DNS server 3010 transmits a DNS response message to the UE 3004 via the IP anchor 3008 and the femtocell BS 3006. Through the DNS request and respond process, the UE 3004 obtains IP address information of a sensor. The UE attempts to set up a TCP connection with a sensor included in the same BS using the obtained IP address. A TCP SYNC message is transmitted to the femtocell BS 3006 and the IP anchor 3008, and the IP anchor 3008 transmits the TCP SYNC message to the femtocell BS 3006 to which the sensor 3002 belongs. The femtocell BS 3006 identifies a sensor to which the TCP SYNC message is to be transmitted, and transmits the TCP SYNC message to the corresponding sensor 3002 using the Bluetooth transmission technology. The sensor 3002 that receives the TCP SYNC message generates a TCP ACK message with respect to the TCP SYNC message, and transmits the same to the femtocell BS 3006. The femtocell BS 3006 that receives the TCP ACK message transmits the TCP ACK message to the IP anchor 3008, and the IP anchor 3008 transmits the TCP ACK message to the femtocell BS 3006 to which the UE 3004 belongs. The femtocell BS 3006 identifies the UE 3004 to which the TCP ACK message is to be transmitted, and transmits the TCP ACK message to the corresponding UE 3004 using LTE or 5G wireless transmission technology. A process of transmitting application data, a TCP connection setup termination message, and the like performed between the UE 3004 and the sensor may be performed in the same manner as the TCP SYNC and TCP ACK transmission process. The conventional transmission technology increases signaling in a mobile communication network and increases the load on the IP anchor 3008 and the DNS server 3010 and the amount of traffic on a core network.

Figure 31:
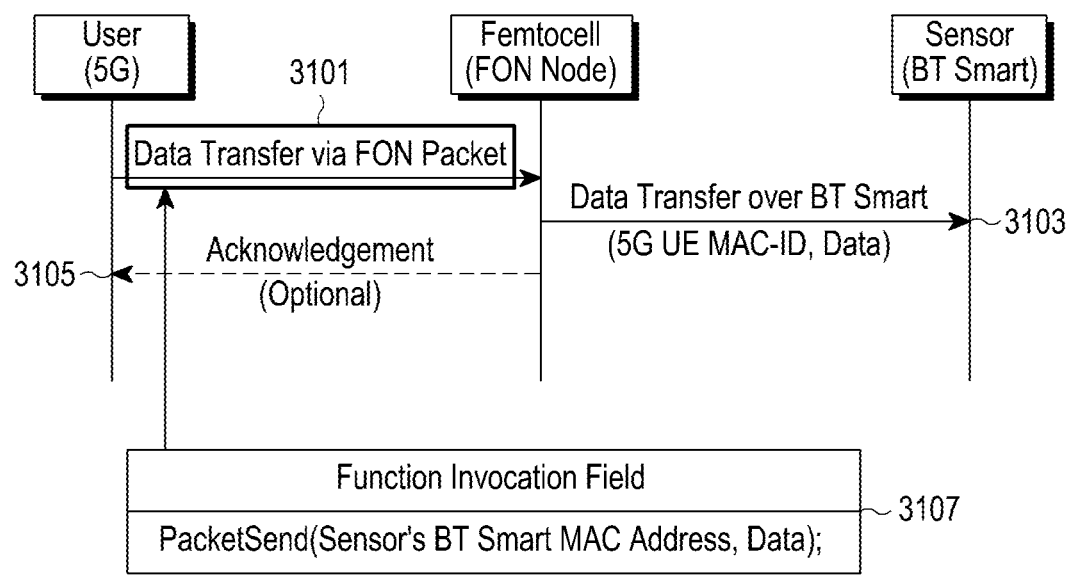
FIG. 31 is a scenario illustrating a data communication process between user equipment and a sensor when the transmission scenario of FIG. 30 is applied to the present invention.

FIG. 31 is a scenario illustrating a process of performing data communication between a UE and a sensor when the transmission scenario of FIG. 30 is applied.

A UE writes a PacketSend( ) function in a function invocation field of a smart packet, includes data to be transmitted to a sensor and a Bluetooth MAC address of the sensor in a payload, and transmits the same to a femtocell BS, in operation 3101. The femtocell BS includes a FON node, thereby being capable of processing the smart packet. The femtocell BS including the FON node extracts data to be transmitted to the sensor and the Bluetooth MAC address of the sensor, which are to be used as an input parameter of the PacketSend( ) function, from the payload, uses the same as an input parameter of the PacketSend( ) function, and executes the PacketSend( ) function written in the function invocation field of the smart packet, as shown in the diagram 3107. As the result of execution of the PacketSend( ) function, the femtocell BS transmits the smart packet of the UE, received using the LTE or 5G transmission technology, to the sensor using the Bluetooth transmission technology in operation 3103. In addition, the femtocell BS informs the UE that the smart packet is normally processed. The above-described embodiment of the present invention may decrease signaling in a mobile communication network when compared to the conventional technology, may distribute a load on a device, such as an IP anchor and a DNS server, and may decrease traffic generated in a core network. Also, an embodiment of the present invention may decrease the load on a radio link, thereby increasing the efficiency of use of radio resources.

A second case is a scenario that collects information about a packet transmission path between terminals.

FIG. 32 is a diagram illustrating a normal example of collecting information about a packet transmission path between terminals. A network device includes equipment, such as a switch, a router, and the like.

To be prepared for a Distributed Denial of Service (DDoS) attack, a normal network structure configures network structure and route information to be private for security reasons. In such a normal network structure, a user and a network manager have difficulty in accurately recognizing the condition and problems of the network, which is a drawback.

FIG. 33 is a scenario of collecting information about a packet transmission path between terminals according to an embodiment of the present invention.

A network device is configured as a FON node. Host 1 and Host 2 are each configured as a FON device. Network devices including a FON node download a network monitoring function from a FON manager and execute dynamic binding, and a user or a network manager includes execution information of the network monitoring function in a smart packet and transmits the same to the FON node. The FON node that receives the smart packet executes a network monitoring function written in the smart packet, stores measured network monitoring information in a DB, and transmits the measured network monitoring information to the user or the network manager. The above-described operational feature of the present invention enables the user and the manager to accurately recognize the condition and problems of the network.

A third case is a packet transmission optimization scenario using a biomimetic ant colony algorithm.

Figure 34:
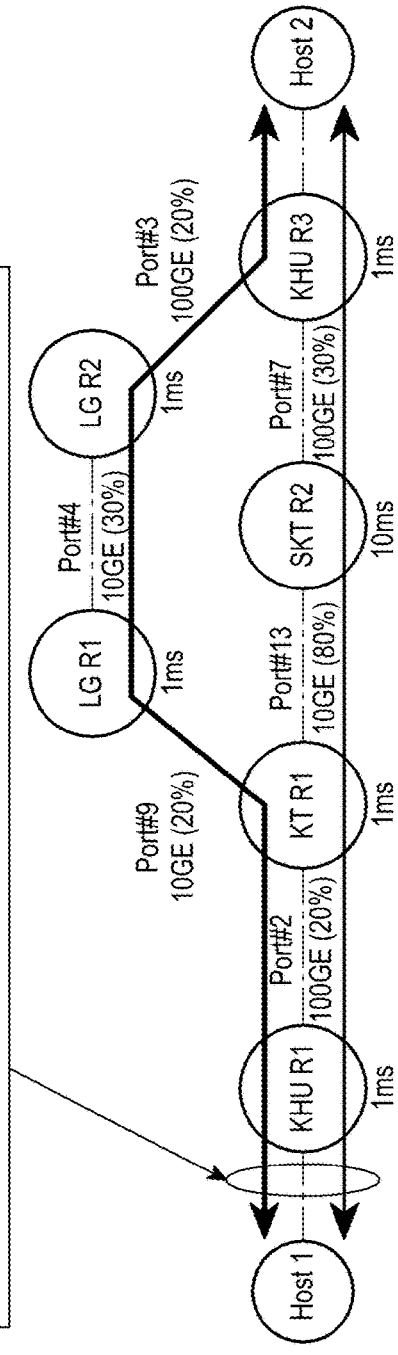
FIG. 34 is a diagram illustrating an example of packet transmission optimization utilizing a biomimetic ant colony algorithm according to an embodiment of the present invention.

FIG. 34 is a diagram illustrating an example of packet transmission optimization using a biomimetic ant colony algorithm according to an embodiment of the present invention.

Host 1 and Host 2 operate as FON devices, and network devices operate as FON nodes. The network devices download biomimetic ant colony algorithm-related functions from a FON manager and perform dynamic binding. In this instance, Host 1 writes, in a function invocation field of a smart packet, function execution information that determines an optimized transmission path from among data transmission paths from Host 1 to Host 2 using the biomimetic ant colony algorithm, and transmits the same to a network device in which a FON node operates. The network device that receives the smart packet executes biomimetic ant colony algorithm functions written in the function invocation field of the smart packet. When the function execution is completed, the smart packet is transmitted to a neighboring network device, and the corresponding network device also executes biomimetic ant colony algorithm functions written in the smart packet. The above-described smart packet transmission and biomimetic ant colony algorithm function execution process is repeatedly executed, and the smart packet reaches Host 2. As the smart packet in which the biomimetic ant colony algorithm functions are written continuously passes through a network, a network device in which a FON node operates is capable of determining an optimized transmission path based on the biomimetic ant colony algorithm. When the present invention is applied to a network, various network protocols and transmission technologies are introduced, and optimized transmission service can be provided.

A fourth case is a $3^{rd}$-party's web service or media service acceleration scenario.

Figure 35:
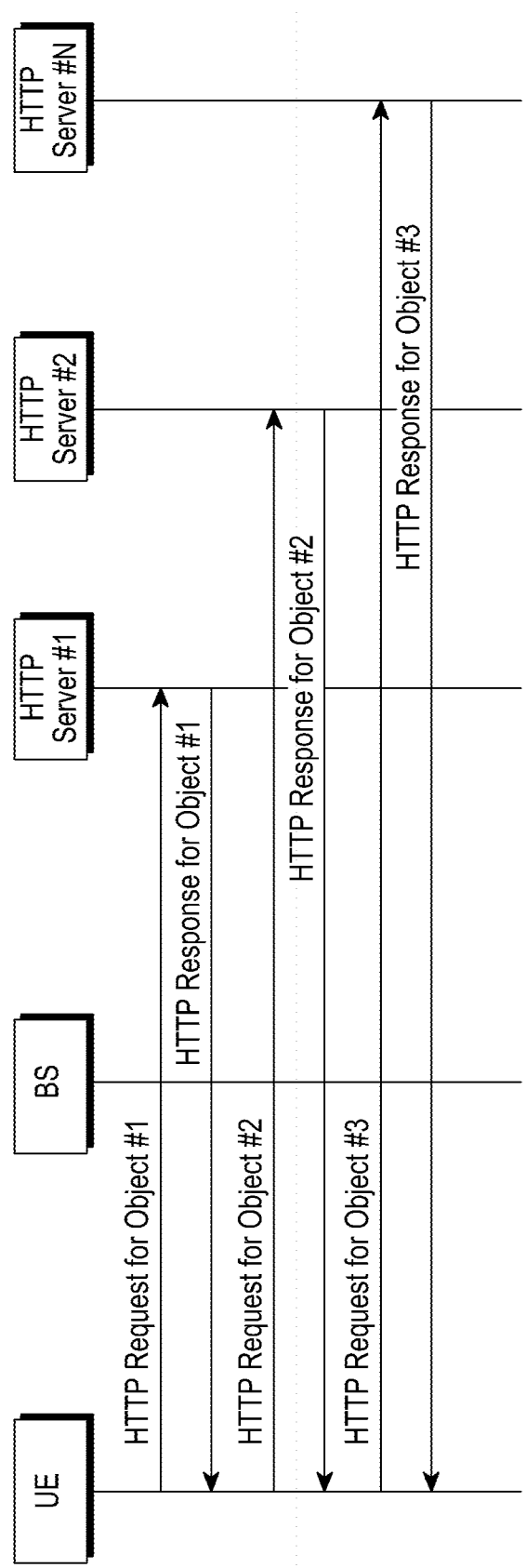
FIG. 35 is a diagram illustrating an example of conventional $3^{rd}$-party web service or media service acceleration.

FIG. 35 is a diagram illustrating an example of conventional $3^{rd}$-party's web service or media service acceleration.

A UE requests three objects forming a webpage from different HTTP servers. The UE generates HTTP request messages for the three objects forming the webpage, and transmits the same to a base station (BS). The BS that receives the HTTP request messages of the UE transmits the HTTP request messages to different HTTP servers. The HTTP request messages reach a 3rd-party's HTTP server 1, HTTP server 2, and HTTP server 3 through a mobile communication network. Each of the 3rd-party's HTTP server 1, HTTP server 2, and HTTP server 3 that receives the HTTP request message may generate an HTTP response message for an object forming the webpage, and transmits the same to the UE. The HTTP response message transmitted from each of the 3rd-party's HTTP server 1, HTTP server 2, and HTTP server 3 is transmitted to the BS to which the UE belongs, through the mobile communication network, and the BS transmits the HTTP response message to the UE. The conventional web service acceleration scheme disposes a $3^{rd}$-party's web server in the mobile communication network, instead of disposing the web server in the Internet, and provides an accelerated web service to a UE in the mobile communication. The conventional scheme accelerates a web service by merely reducing the distance between a UE and a $3^{rd}$-party's web server, but does not accelerate the web service itself.

Figure 36:
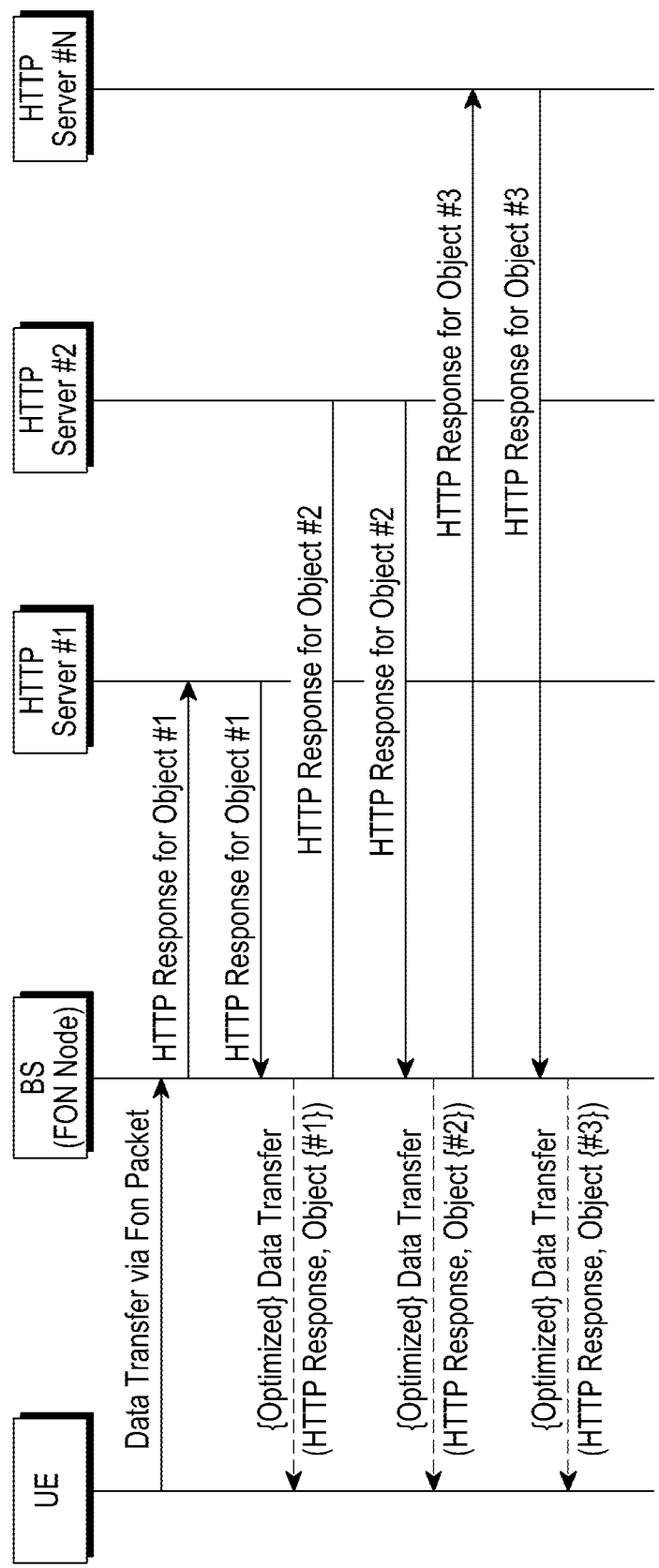
FIG. 36 is a diagram illustrating an example of $3^{rd}$-party web service or media service acceleration according to an embodiment of the present invention.

FIG. 36 is a diagram illustrating an example of $3^{rd}$-party's web service or media service acceleration according to an embodiment of the present invention.

A UE operates as a FON device, and a BS operates as a FON node.

The BS (FON node) downloads, from a FON manager, a function that implements a web service and transmission optimization technology provided by a $3^{rd}$ party, stores the same in a DB, and performs dynamic binding in order to prepare for execution of the function.

The UE (FON device) generates a smart packet that requests a webpage of the $3^{rd}$-party, and transmits the same to the BS. In this instance, not three smart packets are generated and transmitted for three different objects forming the webpage, but a function invocation field is written in a single smart packet for requesting three objects and is transmitted to the BS. The BS that receives the smart packet executes functions written in the smart packet, generates HTTP request messages for three objects forming the webpage, and transmits the messages to a 3rd-party's HTTP server 1, HTTP server 2, and HTTP server 3. Also, when the smart packet that the BS receives includes a transmission function optimized in a core network, the BS may transmit an HTTP request message to a 3$^{rd}$-party's HTTP server. The 3$^{rd}$-party's HTTP server that receives the HTTP request message generates an HTTP response message with respect to an object forming the webpage and transmits the same to the BS. When an object included in the HTTP response message is multimedia content, the BS that receives the HTTP response message from the 3$^{rd}$-party's HTTP server optimizes the content by compressing or reducing the size of the content appropriately for the hardware characteristics of the UE, and transmits the same to the UE.

As described above, the embodiments of the present invention minimize a delay in a wireless section by reducing the number of messages transmitted in the wireless section, optimize 3$^{rd}$-party's content, and optimize transmission in a wired section, such as a core network or the like, thereby accelerating a 3rd-party's web service or media service.

The effects of the present invention are as follows.

First, a new protocol can be introduced, in addition to an IP network protocol. The present invention may implement a new network protocol functionality in a network as a function, may distribute the same to FON nodes, and may invoke a functionality through a smart packet, whereby a network operator/user/Internet service provider can make its own new network protocol and introduce the same in the network.

Second, a network operator and a user/Internet service provider can directly define a routing policy. The present invention supports transmission of traffic through a packet path defined by the network operator and the user/Internet service provider through a function implemented by themselves.

Third, supplementary functionality required by a packet in addition to transmission of the packet can be supported in a FON node.

The present invention overcomes the drawbacks of the conventional SDN/OpenFlow.

First, the present invention supports programmability from the perspective of a flow in which a network operator and a user/Internet service provider determine a path through which a packet is transferred, which is a solution for the drawback that the conventional router technology fails to overcome. As mentioned in the above as the solution for the drawback of the conventional router technology, the present invention may implement a new network protocol functionality in a network as a function, may distribute the same to FON nodes, and may invoke a function through a smart packet, whereby the network operator/user/Internet service provider can make its own new network protocol and introduce the same in the network. Also, the present invention supports transmission of traffic through a packet path defined by the network operator/user/Internet service provider through a function implemented by themselves.

Second, as mentioned in the above as the solution for the drawback of the conventional router technology, a network operator and a user/Internet service provider implement desired functionality in a network and utilize the same in a service. As mentioned in the above as the solution for the drawback of the conventional router technology, supplementary functionality required by a packet in addition to the transmission of the packet is supported in a FON node.

Third, as mentioned in the above as the solution for the drawback of the conventional router technology, a network operator and a user/Internet service provider can concretely recognize the dynamic/static state of a network. As shown through the scenarios that utilize the present technology, the dynamic/static state of the network can be recognized through a smart packet as a supplementary functionality of a FON node is implemented.

Fourth, as a solution to a drawback that newly rises as the SDN/OpenFlow technology is introduced, the implementation of a Deep Packet Inspection (DPI) functionality for analyzing packet header information is simplified. A load from analyzing each of a complex packet structure is not needed, and the complexity may be decreased to a level at which a function invocation part is simply analyzed.

Fifth, as a solution to a drawback that newly rises as the SDN/OpenFlow technology is introduced, a load on an interface between an SDN controller and OpenFlow switch, which are centralized, is not generated. In the conventional SDN/OpenFlow, only a controller performs intelligent processing. However, a FON node autonomously performs intelligent packet processing, and thus a load on an interface with a FON node manager is not large when compared to that of the SDN.

A method and apparatus for generating a packet in a mobile communication system according to an embodiment of the present invention may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. A method of generating and reporting channel information in a mobile communication system according to an embodiment of the present invention may be implemented by a computer or portable terminal including a controller and a memory, and the memory is one example of a program including instructions for realizing the embodiments of the present invention or a machine-readable storage medium suitable for storing programs.

Accordingly, the present invention includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present invention appropriately includes equivalents of the program.

Also, in a mobile communication system according to an embodiment of the present invention, a packet-generating apparatus may receive a program from a wired or wirelessly connected program-providing apparatus, and may store the same. The program-providing apparatus may include: a program including instructions to enable a program-processing apparatus to execute a packet-generating method in a previously configured mobile communication system; a memory for storing information required for implementing the packet-generating method in the mobile communication system; a communication unit for wired or wirelessly communicating with a graphic processing device; and a controller for transmitting a corresponding program to a transmitting/receiving device automatically or at the request of the graphic processing device.

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

The invention claimed is:

1. A method of transmitting a packet by an apparatus in a mobile communication system, the method comprising:
generating, based on a first function table including at least one function name and one function code of a first set of functions, a function-based packet comprising function invocation information comprising information for identifying at least one function to be invoked at a receiving apparatus; and
transmitting the function-based packet,
wherein the at least one function is executed by the receiving apparatus that has received the function-based packet, based on information retrieved from a second function table including at least one function name and one function code of a second set of functions,
wherein the first set of functions is updated if the apparatus receives a function distribution message from a managing device,
wherein the second set of functions is updated if the receiving apparatus receives the function distribution message from the managing device,
wherein function usage information on a number of times that a function has been invoked at the apparatus and the receiving apparatus is transmitted to the managing device, and
wherein a path, through which the function-based packet is transferred, is determined based on the first function table.

2. The method of claim 1, wherein the function invocation information comprises a function name and a parameter.

3. The method of claim 2, wherein the function name comprises at least one of: a packet-transport-related function, a system information retrieval function, a user information retrieval function, a user-storage-usage-related function, or an operator-functionality-execution-related function.

4. The method of claim 2, wherein the parameter comprises an input parameter and an output parameter of a function desired to be invoked.

5. The method of claim 1, wherein the function-based packet excludes an internet protocol (IP) address.

6. A method of receiving a packet by an apparatus in a mobile communication system, the method comprising:
receiving a function-based packet comprising function invocation information comprising information for identifying at least one function to be invoked, wherein the function-based packet has been generated by a transmitting apparatus based on a first function table including at least one function name and one function code of a first set of functions;
invoking the at least one function based on information retrieved from a second function table including at least one function name and one function code of a second set of functions; and
executing the at least one function,
wherein the first set of functions is updated if the transmitting apparatus receives a function distribution message from a managing device,
wherein the second set of functions is updated if the apparatus receives the function distribution message from the managing device,
wherein function usage information on a number of times that a function has been invoked at the apparatus and the transmitting apparatus is transmitted to the managing device, and
wherein a path, through which the function-based packet is transferred, is determined based on the first function table.

7. The method of claim 6, wherein the function invocation information comprises a function name and a parameter.

8. The method of claim 7, wherein the function name comprises at least one of: a packet-transport-related function, a system information retrieval function, a user information retrieval function, a user-storage-usage-related function, or an operator-functionality-execution-related function.

9. The method of claim 7, wherein the parameter comprises an input parameter and an output parameter of a function desired to be invoked.

10. The method of claim 6, wherein the function-based packet excludes an internet protocol (IP) address.

11. An apparatus for receiving a packet in a mobile communication system, the apparatus comprising:
a transceiver; and
at least one processor coupled with the transceiver and configured to:
receive a function-based packet comprising function invocation information comprising information for identifying at least one function to be invoked, wherein the function-based packet has been generated by a transmitting apparatus based on a first function table including at least one function name and one function code of a first set of functions,
invoke the at least one function based on information retrieved from a second function table including at least one function name and one function code of a second set of functions, and
execute the at least one function,
wherein the first set of functions is updated if the transmitting apparatus receives a function distribution message from a managing device,
wherein the second set of functions is updated if the apparatus receives the function distribution message from the managing device,
wherein function usage information on a number of times that a function has been invoked at the apparatus and the transmitting apparatus is transmitted to the managing device, and
wherein a path, through which the function-based packet is transferred, is determined based on the first function table.

12. The apparatus of claim 11, wherein the function invocation information comprises a function name and a parameter.

13. The apparatus of claim 12, wherein the function name comprises at least one of: a packet-transport-related function, a system information retrieval function, a user information retrieval function, a user-storage-usage-related function, or an operator-functionality-execution-related function.

14. The apparatus of claim 12, wherein the parameter comprises an input parameter and an output parameter of a function desired to be invoked.

15. The apparatus of claim 11, wherein the function-based packet excludes an internet protocol (IP) address.

16. An apparatus for transmitting a packet in a mobile communication system, the apparatus comprising:
a transceiver; and
at least one processor coupled with the transceiver and configured to:

generate, based on a first function table including at least one function name and one function code of a first set of functions, a function-based packet comprising function invocation information comprising information for identifying at least one function to be invoked at a receiving apparatus, and transmit the function-based packet, wherein the at least one function is executed by the receiving apparatus that has received the function-based packet, based on information retrieved from a second function table including at least one function name and one function code of a second set of functions, wherein the first set of functions is updated if the apparatus receives a function distribution message from a managing device, wherein the second set of functions is updated if the receiving apparatus receives the function distribution message from the managing device, wherein function usage information on a number of times that a function has been invoked at the apparatus and the receiving apparatus is transmitted to the managing device, and wherein a path, through which the function-based packet is transferred, is determined based on the first function table.

17. The apparatus of claim 16, wherein the function invocation information comprises a function name and a parameter.

18. The apparatus of claim 17, wherein the function name comprises at least one of: a packet-transport-related function, a system information retrieval function, a user information retrieval function, a user-storage-usage-related function, or an operator-functionality-execution-related function.

19. The apparatus of claim 17, wherein the parameter comprises an input parameter and an output parameter of a function desired to be invoked.

20. The apparatus of claim 16, wherein the function-based packet excludes an internet protocol (IP) address.

* * * * *